(12) United States Patent
Cho

(10) Patent No.: US 12,229,848 B2
(45) Date of Patent: Feb. 18, 2025

(54) IMAGE PROCESSING DEVICE, IMAGE PROCESSING METHOD, PRODUCTION SYSTEM, PRODUCT MANUFACTURING METHOD, AND STORAGE MEDIUM

(71) Applicant: CANON KABUSHIKI KAISHA, Tokyo (JP)

(72) Inventor: Genki Cho, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 17/666,144

(22) Filed: Feb. 7, 2022

(65) Prior Publication Data

US 2022/0261943 A1    Aug. 18, 2022

(30) Foreign Application Priority Data

Feb. 12, 2021    (JP) .................................. 2021-020421

(51) Int. Cl.
| | |
|---|---|
| *G06T 1/00* | (2006.01) |
| *B25J 9/16* | (2006.01) |
| *G06T 7/73* | (2017.01) |
| *G06V 10/40* | (2022.01) |
| *H04N 7/18* | (2006.01) |
| *H04N 23/695* | (2023.01) |

(52) U.S. Cl.
CPC .......... *G06T 1/0014* (2013.01); *B25J 9/1697* (2013.01); *G06T 7/73* (2017.01); *G06V 10/40* (2022.01); *H04N 7/183* (2013.01); *H04N 23/695* (2023.01); *G06T 2207/30244* (2013.01)

(58) Field of Classification Search
CPC ..................... G06T 1/0014; G06T 7/73; G06T 2207/30244; G06V 10/40; H04N 23/695; H04N 7/183; B25J 9/1697
See application file for complete search history.

(56) References Cited

U.S. PATENT DOCUMENTS

| | | | |
|---|---|---|---|
| 2017/0148153 A1 | 5/2017 | Nakao | |
| 2022/0245849 A1* | 8/2022 | Safronov | ............. G06V 10/774 |

FOREIGN PATENT DOCUMENTS

| | | | |
|---|---|---|---|
| CN | 103369234 A | | 10/2013 |
| JP | 2013074376 A | | 4/2013 |
| JP | 2013140042 A | | 7/2013 |
| JP | 2017096749 A | | 6/2017 |
| JP | 2018144165 A | * | 9/2018 |
| JP | 2018179859 A | | 11/2018 |
| JP | 2020109915 A | | 7/2020 |

OTHER PUBLICATIONS

WIPO English translation of JP-2018144165-A. (Year: 2018).*

* cited by examiner

*Primary Examiner* — Jason Holloway
*Assistant Examiner* — Christopher A Buksa
(74) *Attorney, Agent, or Firm* — Canon U.S.A., Inc. IP Division

(57) ABSTRACT

In order to provide an image processing device capable of supporting installation of an imaging unit, an image processing device includes: an image acquiring unit configured to acquire an image; a feature information extracting unit configured to extract feature information from the image; and a first generation unit configured to generate installation support feature information used for supporting installation of the imaging unit on the basis of the feature information extracted by the feature information extracting unit.

10 Claims, 13 Drawing Sheets

| ID | FEATURE INFORMATION | SIZE | ID | FEATURE INFORMATION | SIZE |
|---|---|---|---|---|---|
| 1 | ⊞ | 742 | 8 | ▯ | 112 |
| 2 | ☐ | 131 | 9 | ▯ | 110 |
| 3 | ☐ | 129 | 10 | ▯ | 109 |
| 4 | ☐ | 129 | 11 | ▯ | 107 |
| 5 | ☐ | 127 | 12 | ▯ | 106 |
| 6 | ☐ | 125 | 13 | ▯ | 105 |
| 7 | ☐ | 124 | 14 | | |

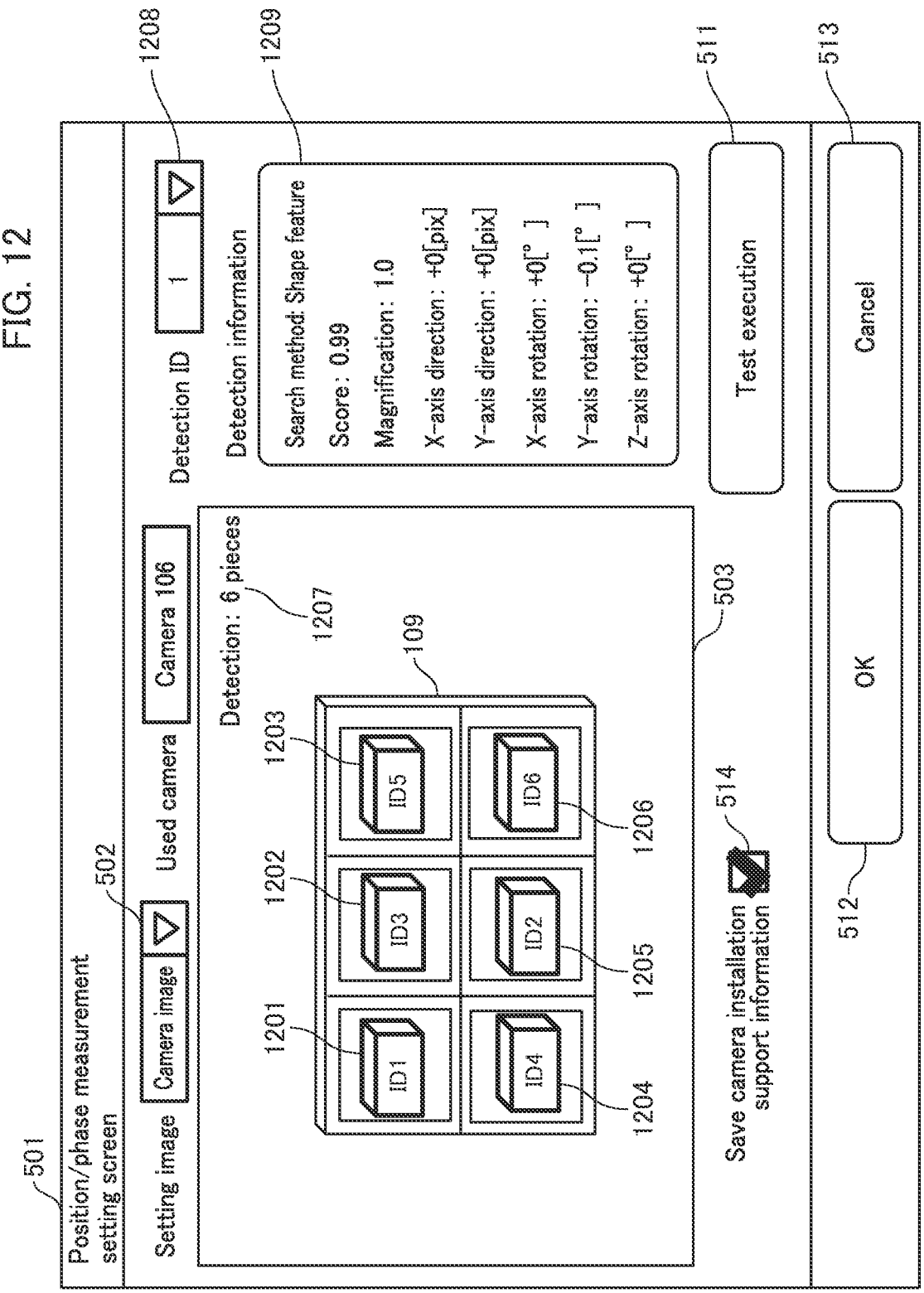

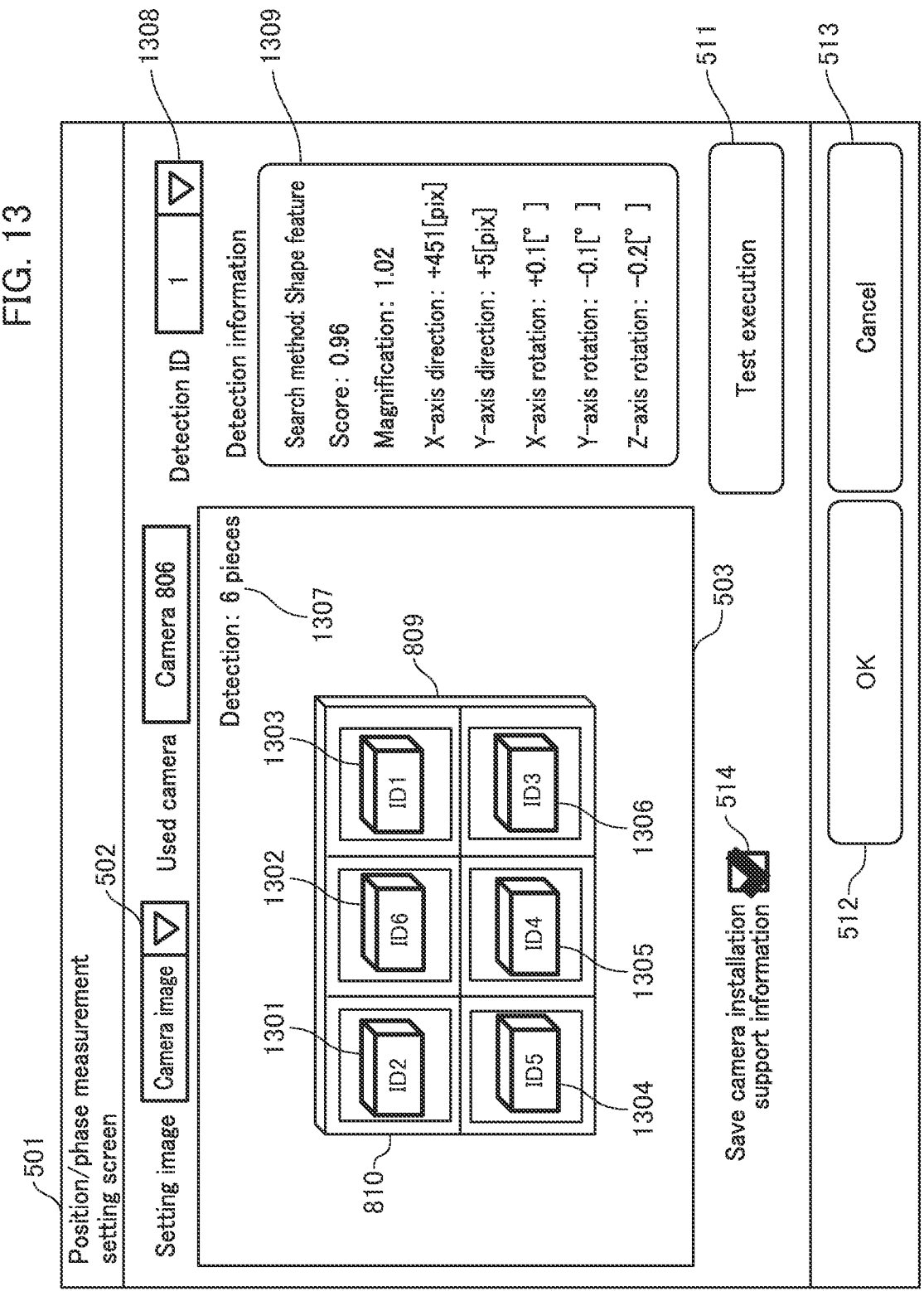

IMAGE PROCESSING DEVICE, IMAGE PROCESSING METHOD, PRODUCTION SYSTEM, PRODUCT MANUFACTURING METHOD, AND STORAGE MEDIUM

BACKGROUND

Field

The present disclosure relates to an image processing device and the like capable of supporting installation of an imaging unit.

Description of the Related Art

For the purpose of production, quality checking, transportation, and the like of products, technologies for controlling various robot devices such as a gripping device, a robot arm, and other actuators and conveying devices are known. In addition, technologies for imaging a target (hereinafter, referred to as a work piece) using an imaging device such as a camera, monitoring devices and an operation status by performing image processing on recorded image data, measuring a position of a work piece, and performing inspection are known as well.

By using the imaging device and the image processing device described above, measurement and inspection through visual observation, manual assembly, manual alignment, and the like become unnecessary. In addition, switching between control instructions and operation correction of a robot device can be performed, and thus a system performing more varied desired operations can be constructed.

In addition, by performing switching between processing details of image processing, different processing can be performed on one piece of image data, and thus measurement and inspection through analysis of a plurality of different areas, processing of an image, and monitoring can be performed. If visual functions of a production system and a conveying system are realized using an imaging device such as a camera and an image processing device, it is important to install the camera at an appropriate position with an appropriate posture within the system and secure a desired composition with respect to a work piece and a relative positional relation with other devices.

In addition, there are cases in which, for example, in accordance with an increase in the amount of distribution and an increase in the amount of production of products, relating to the conveying system and the production system as described above, processes are not able to be completed using only a system that has been initially constructed, and a system of an equivalent specification needs to be replicated (additionally installed) inside the same production factory, another production factory, or the like. In such replicated systems, the processing speed, the accuracy, and the reliability of the conveying system and the production system that have been replicated are required to be equal to or greater than those of the conveying system and the production system that have been initially built. Thus, complicated adjustment is repeated until the processing speed, the accuracy, and the reliability that are required are obtained while repeating processes of adjustment of a position and a posture of the camera, checking of an operation of the image processing device, checking of an operation of the system, and the like any number of times.

For example, in Japanese Patent Laid-Open No. 2020-109915, a determination unit determining a type of a subject within an image is included, and imaging parameters and compositions that are appropriate for imaging the subject are recommended to a user by referring to a history of past imaging methods from a result of the determination of the subject. For this reason, a user can be assisted such that an image having a similar composition can be smoothly captured by referring to captured images of professional cameramen and past captured images.

However, in Japanese Patent Laid-Open No. 2020-109915, although next imaging parameters and the like can be recommended on a GUI by referring to a history of imaging parameters at the time of previously imaging subjects and the like, it is difficult to apply such a technology, for example, to a manufacturing system requiring image measurement and image processing of high accuracy. In other words, it is difficult to apply such a technology to a system in which installation of a camera and adjustment of a position and a posture need to be performed for reproducing an imaging position in units of sub pixels to several pixels.

For example, a process of taking out a work piece such as an electronic circuit of several centimeters from a tray by employing a robot or aligning a work piece to be aligned on a discharge device in a conveying system may be considered. In the case, generally, the accuracy required for an image measuring device is frequently to a few a micrometers to several millimeters.

In such a case, if a camera is not appropriately installed, large measurement error is included in an image measurement result, and thus, the robot cannot grip a work piece with high accuracy, and a palletizing (alignment) for a conveyer is not performed well. In addition, there is a likelihood of a work piece being dropped, simply gripping a work piece failing, or a work piece colliding with a conveying device in the vicinity thereof or the like and damaged due to an unexpected gripping posture of the work piece in some cases.

For this reason, in such a conveying system or a production system, relative positional relations and postures of a camera and various peripheral devices (a robot, a conveying device, a workbench, and the like) are important, and complicated adjustment operations as described above are necessary.

In addition, not only in a replicated system but also in a system that has been initially built, the camera may need to be replaced, for example, due to a deviation of the position of the camera according to some issue, a personal mistake, or the like or an occurrence of a breakdown of the camera during the operation of the system. Also in such a case, there is an issue in that complicated adjustment operations as described above are necessary.

There is a need in the art to provide an image processing device capable of solving the issues described above and supporting installation of an imaging unit.

SUMMARY

According to one aspect of the present disclosure, in order to solve the issues described above, an image processing device includes at least one processor or circuit configured to function as: an image acquiring unit configured to acquire an image; a feature information extracting unit configured to extract feature information from the image; and a first generation unit configured to generate installation support feature information used for supporting installation of the imaging unit on the basis of the feature information extracted by the feature information extracting unit.

Further features of the present disclosure will become apparent from the following description of embodiments with reference to the attached drawings.

BRIEF DESCRIPTION OF THE DRAWINGS

FIG. 12 is a checking screen for a position/phase measurement result of a work piece when a test execution button 511 is clicked in FIG. 5.

FIG. 13 is a diagram illustrating a measurement result checking screen after camera position adjustment according to an embodiment.

DESCRIPTION OF THE EMBODIMENTS

Hereinafter, with reference to the accompanying drawings, favorable mode of the present disclosure will be described using Embodiments. In each diagram, the same reference signs are applied to the same members or elements, and duplicate description will be omitted or simplified.

Figure 1:
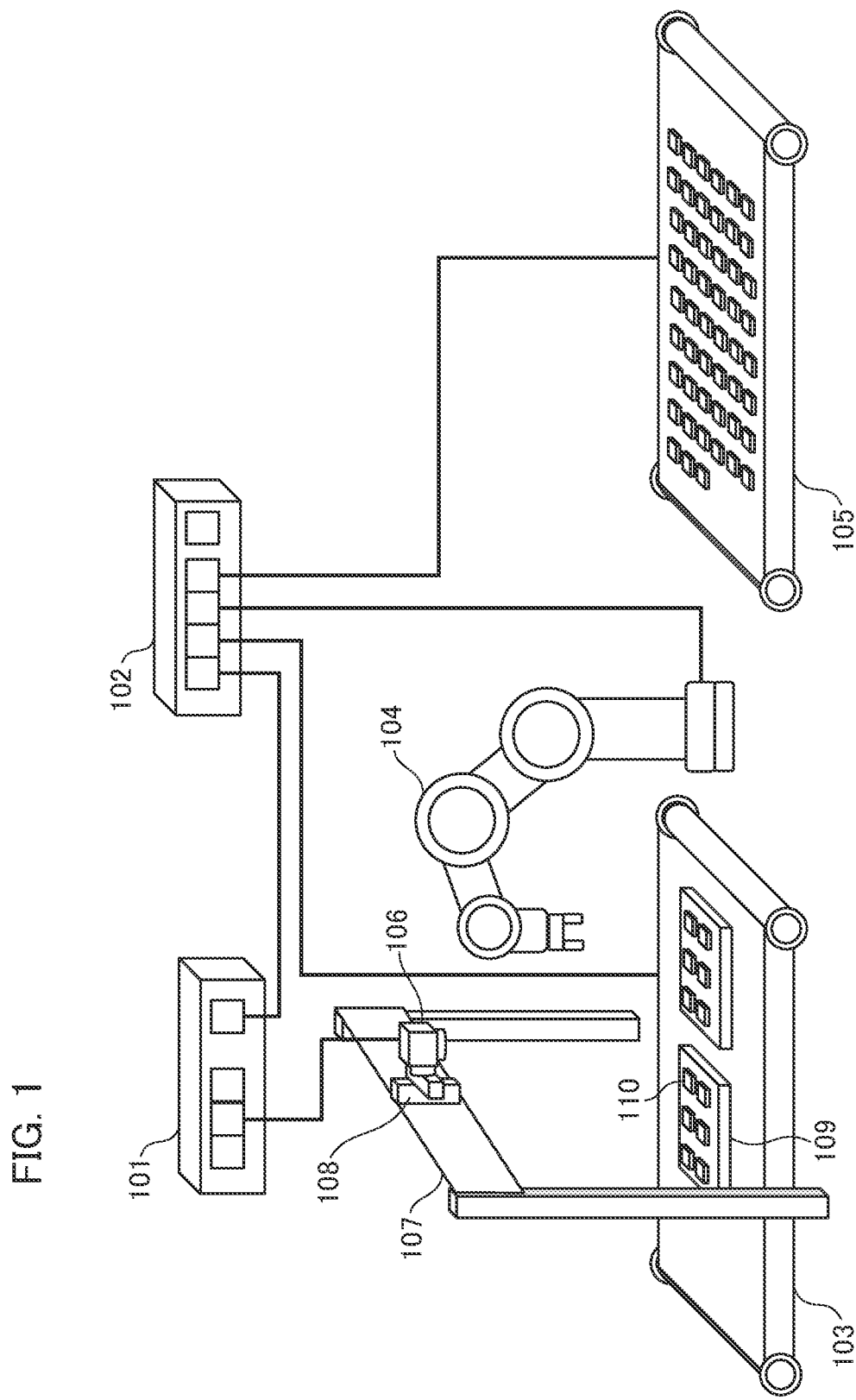
FIG. 1 is an entire configuration diagram of a production system including an image processing device 101 according to an embodiment.

FIG. 1 is an entire configuration diagram of a production system including an image processing device 101 according to an embodiment.

A system control device 102 is illustrated, and the entire operation of the production system is controlled by transmitting instructions from the system control device 102 to the image processing device 101, a loading device 103, a robot 104, and a discharge device 105. In addition, the system control device 102 has a computer such as a CPU built thereinto and has a memory, which is not illustrated, built thereinto, and controls the entire production system by reading computer programs from the memory described above.

The production system illustrated in FIG. 1 has a loading step of loading a tray 109 on which work pieces 110 as a plurality of target objects are loaded using the loading device 103. In addition, a position and a posture of the work piece 110 are measured using the image processing device 101 and a camera 106 as a first imaging unit. In other words, the image processing device 101 acquires measurement feature information used for measuring a position and a posture of a work piece and measures the position and the posture of the work piece by searching for the measurement feature information described above in an image acquired by the imaging unit. In addition, the work piece 110 is gripped on the basis of a result of the measurement by the robot 104 as a gripping unit, is taken out from the tray 109, and alignment in the discharge device 105, a working process, and the like are performed on the work piece 110, whereby a product is manufactured.

The image processing device 101 has a computer such as a CPU built thereinto and has a memory, which is not illustrated, built thereinto and functions as an image processing unit that reads a computer program from the memory described above and sets or performs various kinds of image processing. The camera 106 functions as an image acquiring unit and acquires an image of a target object by performing capturing of an image. Although the camera 106 and image processing device 101 is disposed within the system as separate bodies in FIG. 1, the camera 106 and the image processing device 101 may be integrally configured.

Similarly, the image processing system is composed of the image processing device 101 and the system control device 102, and the image processing device 101 and the system control device 102 may be integrally formed. Furthermore, although the image processing device 101 and the system control device 102 may be loaded in the same casing as that of the robot 104, the camera 106, or the like, they will be described as separate bodies in this embodiment.

The robot 104 has a robot control device built thereinto, receives control instructions from the outside, and controls operations of gripping mechanisms such as shafts of the robot, robot hands (end effectors), and the like. In this embodiment, although the robot is illustrated to have the configuration of an articulated robot, a uniaxial drive device, a rotation stage, an orthogonal robot, or the like may be used as a drive device. Furthermore, the robot may be a system device configured by combining a robot hand (an end effector) including a gripping mechanism and a suction mechanism and the like.

A stand 107 is used for fixing the camera 106 and a camera position adjusting stage 108. The camera position adjusting stage 108 can adjust a spatial position and a posture of the camera in accordance with a signal from the outside or manually by performing axial adjustment.

In this embodiment, the system control device 102 will be described as performing control instructions for the entire system. However, the production system may be operated in accordance with a control instruction from an operation device disposed outside the production system illustrated in FIG. 1 or may be configured to be automatically operated on the basis of a time chart set in advance. In addition, on the basis of a result of processing performed by the image processing device 101 and the like, another image processing may be performed by another device of a later stage, or the robot may be controlled by the other device described above on the basis of a result of the image processing.

The image processing device 101 and the camera 106 are configured to be able to perform imaging in an arbitrary sequence using imaging parameters, process a captured image, and output a result thereof. The camera 106 may include mechanisms used for changing various imaging parameters such as a pan, a tilt, a zoom magnification, a focal distance, a diaphragm, a signal amplification rate, and the like. In addition, in accordance with an instruction from the image processing device 101 or the system control device 102, the camera is able to control an imaging angle by controlling the pan and the tilt described above and change various imaging parameters such as the zoom magnification, the focal distance, the diaphragm, the signal amplification rate, and the like.

In a production system in which there are many repetitive operations as in FIG. 1 for an industrial use or the like, the image processing device is used as a visual sense of the robot and the conveying device, and thus, the operation of the entire production system is set in advance by the system control device 102. In addition, a timing, parameters, a composition, and the like of imaging that are preferable for image processing are set in advance as well.

Figure 2:
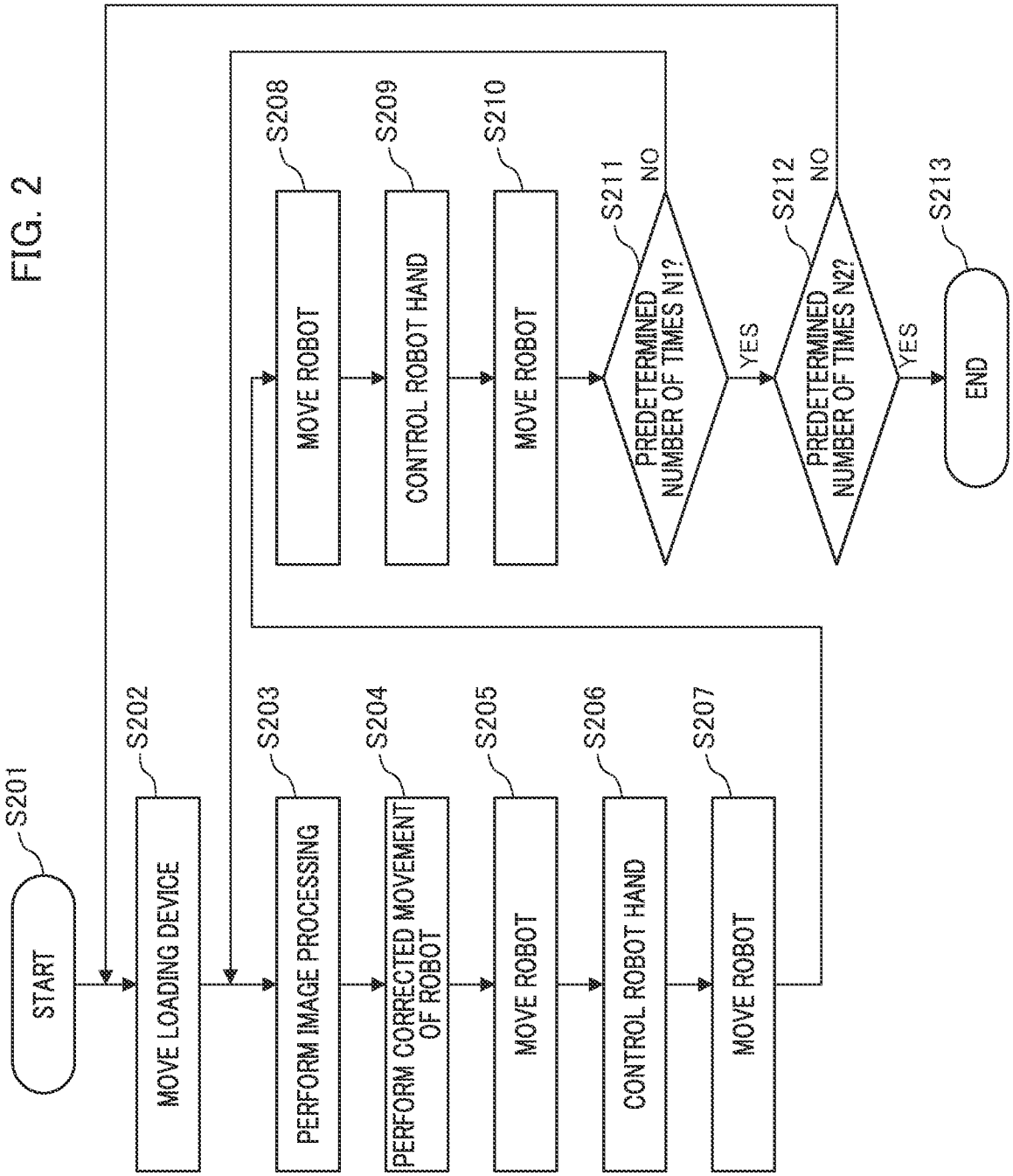
FIG. 2 is a flowchart illustrating an example of a system operation set to a system control device 102 according to an embodiment in detail.

FIG. 2 is a flowchart illustrating an example of a system operation set to the system control device 102 according to an embodiment in detail. The system operation according to this embodiment is operated in accordance with a computer program of a flowchart generated by a user using the system control device 102.

However, after a system control operation is generated by a system control program generating device not illustrated in FIG. 1, the program may be downloaded into a memory of the system control device 102. Alternatively, a package function including a computer program of combinations of flowcharts that are prepared typically for each function or for each purpose in advance may be provided in the form of being selected by a user on a GUI, parameters being adjusted, or the like.

In the flowchart illustrated in FIG. 2, the system control device 102 loads the tray 109 on which a work piece 110 is loaded by the loading device 103 and measures a position and a posture of the work piece 110 using the image processing device 101 and the camera 106. The flowchart illustrates an example of the flow of the process of extracting the work piece 110 from the tray 109 while gripped by the robot 104 and aligning the work piece in the discharge device 105 in detail.

The system control device 102 starts a system operation in Step S201. In addition, in accordance with transmission of a control instruction from the system control device 102 to the loading device 103, the loading device 103 moves a stage by a predetermined amount of feeding in Step S202. In accordance with this, the tray 109 on which the work piece 110 is loaded is carried in to a predetermined position.

The system control device 102 transmits an image processing instruction to the image processing device 101 in Step S203. The image processing device 101 performs image processing using an image of a target object acquired by the camera 106 and measures a position and a posture of the work piece 110. Then, when the position and the posture of the work piece 110 can be determined by the image processing device 101, the image processing device 101 is caused to reply to the system control device 102 with a result thereof. At that time, the image processing device 101 may further measure a type of the work piece 110 using the image obtained by the camera 106 and change the discharge position or perform sorting as necessary. Alternatively, a quality inspection of whether there is a problem of quality such as a defect in the work piece 110 may be performed using image processing.

In addition, when the work piece 110 cannot be detected, the system control device 102 may determine that the amount of feeding of the loading device is insufficient and feed the stage of the loading device 103 further. In addition, a status of the work piece 110 or the tray 109 may be determined in accordance with a result of the process of Step S203, and, for example, when work pieces overlap each other or overflow from the tray, the system control device 102 may change a control speed of the robot 104 or stop the operation of the system.

In Step S204, in accordance with the replied information of the position and the posture of the work piece 110, the system control device 102 performs a correction operation of moving the robot 104 to the upper side of the work piece 110 or rotating a hand (an end effector).

The system control device 102 moves the hand of the robot 104 to a position at which the work piece can be gripped by the hand (the end effector), for example, to the right upper side of the work piece 110 or the like in Step S205.

The system control device 102 causes the work piece 110 to be gripped (picked) by controlling the opening/closing of the hand in Step S206. At this time, for example, one work piece is gripped each time in FIG. 1. Then, the work piece is moved to the upper side of the discharge device 105 using the robot 104 in Step S207. Furthermore, the system control device 102 moves the robot 104 to immediately above a predetermined setting position in correspondence with determination of the number of times of repetition in Step S211 of the flowchart and a loading quantity obtained from the outside in Step S208.

The system control device 102 sets (places) the work piece 110 to a predetermined setting position by controlling the opening/closing the hand in Step S209. Then, the system control device 102 causes the robot to move (withdraw) to the upper side of a carrier stand in Step S210.

When the number of operations of the robot is smaller than a predetermined number of times N1 (in the case illustrated in FIG. 1, N1=2), and the system control device 102 determines that setting of all the two work pieces 110 corresponding to one row that is horizontally aligned has not been completed in Step S211, the process returns to Step S203. Then, the operations of Steps S203 to S211 are performed again. On the other hand, when the number of operations reaches the predetermined number of times N1, the system control device 102 determines that setting of work pieces corresponding to one row has been completed, and the process proceeds to Step S212.

In Step S212, when the number of operations is smaller than a predetermined number of times N2 (in the case illustrated in FIG. 1, N2=3), and it is determined that setting of all the work pieces 110 corresponding to three rows on the tray has not been completed (No), the process returns to Step S202, and the loading device 103 advances the tray by one row. Then, Steps S202 to S212 are performed.

When the number of operations has reached the predetermined number of times N2 (in the case illustrated in FIG. 1, N2=3), and it is determined that setting of all the work pieces 110 corresponding to three rows has been completed (Yes) in Step S212, the process proceeds to Step S213. In accordance with this, gripping of work pieces on one tray and a setting operation for the work pieces are completed. The entire flow illustrated in FIG. 2 is performed again for the next tray.

In addition, in the case of such a production system, the imaging device and the image processing device can be not only used as the visual sense of the robot as described above but also used for the purpose of monitoring the operation status of the system. For example, continual monitoring can be performed regarding whether work pieces loaded into the loading device 103 or the tray 109 have collapsed, whether the robot 104 has performed movement deviating from a desired operation, or whether there is a situation hindering an operation near an operation area.

Figure 3:
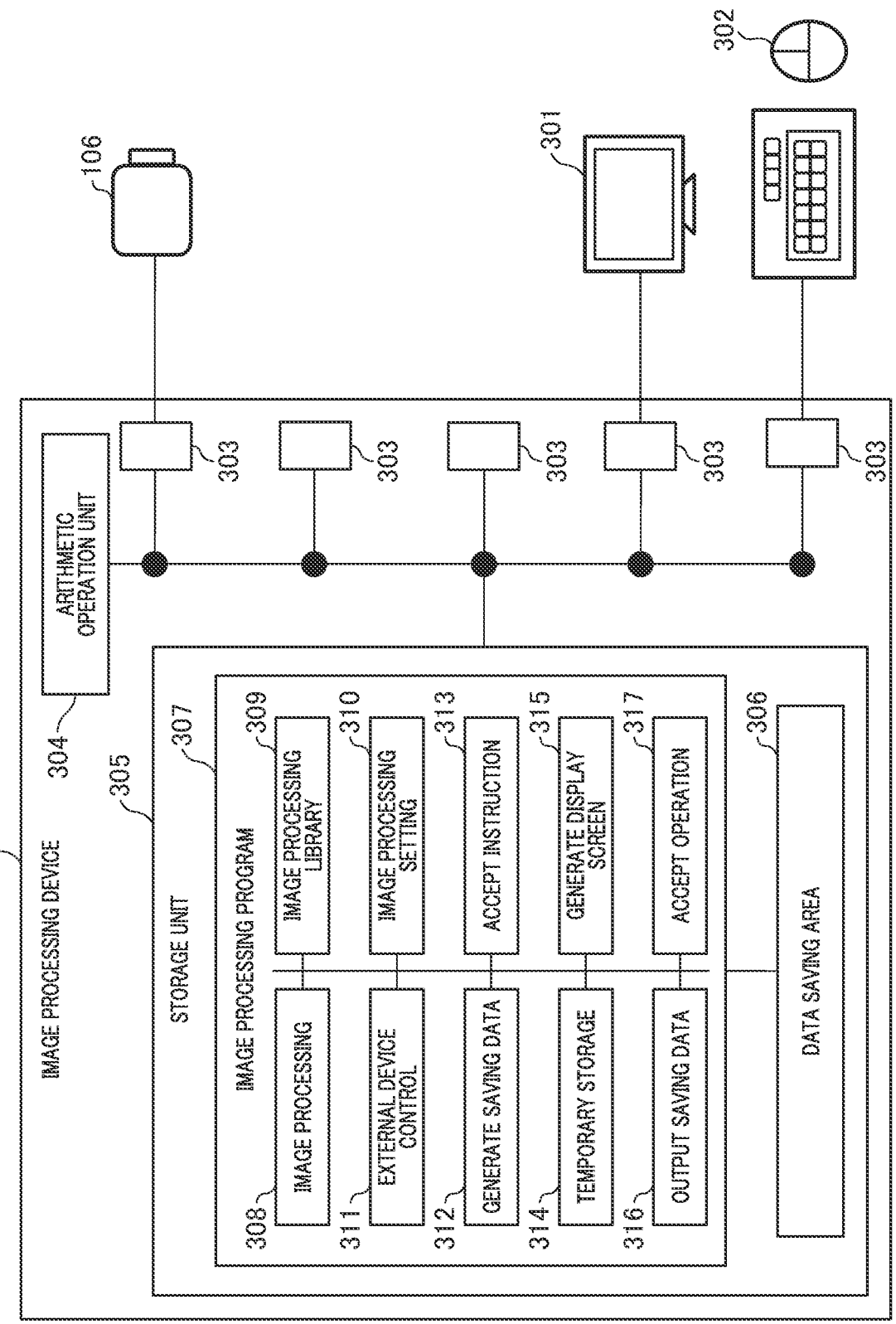
FIG. 3 is a block diagram of an image processing device 101 according to an embodiment.

FIG. 3 is a block diagram of the image processing device 101 according to the embodiment. The image processing device 101 includes an input/output display device 301 as a display unit configured using a liquid crystal panel and the like and an operation input device 302 for various operation inputs that is configured using a keyboard and a mouse, a touch panel, an input operation controller, a gesture input device, and the like. The input/output display device 301 and the operation input device 302 mainly configure a user interface.

In addition, the image processing device 101 may be connected to not only the camera 106 but also the camera position adjusting stage 108 and the like for control. Furthermore, a lighting device composed of a halogen lamp, a light emitting diode lamp, or the like may be additionally disposed for imaging, and an external storage device may be connected for increasing a storage area. The units described above are connected through an interface 303 disposed on internal buses of the image processing device 101. The interfaces 303 are configured on the basis of specifications that are appropriate for communicating with the units described above. For example, the interfaces are composed of a network interface, a serial communication interface, and the like.

The image processing device 101 includes a CPU as a computer composed of a general-purpose microprocessor and an arithmetic operation unit 304 composed of an image processing processor and the like as control devices that are processing bodies of image processing. The arithmetic operation unit 304 is connected to a storage unit 305 through internal buses (a data bus, an address bus, and other control lines, and the like). The storage unit 305, for example, is composed of a ROM, a RAM, or a nonvolatile memory device such as an E(E)PROM. Alternatively, the storage unit 305 may be configured using an external storage device (an HDD or a storage device composed of semiconductor elements which is not illustrated, an external storage device that can be connected to the interfaces 303, and the like) and the like.

A data saving area 306 of the storage unit 305 is composed or a RAM area in the storage unit 305 or a file area, a virtual storage area, and the like of an external storage device. The data saving area 306 is used for temporarily storing processing data and is used for storing setting parameters and the like of image processing. In addition, an image processing program 307 as a computer program for performing image processing according to this embodiment is stored in the storage unit 305.

The image processing program 307 changes settings and the like of image processing and performs image processing in accordance with various operations performed using the operation input device 302 and the like. In addition, the image processing program 307 can save changed details in the data saving area 306 or delete the changed details. Furthermore, the image processing program 307 can transmit/receive data to/from an external control device through the interfaces 303, can be connected to an external storage unit and the like and store data in the external storage unit, and receive data from the external storage unit as an input.

The image processing program 307, for example, is composed of software that realizes the following functions. First, image processing 308 is a main part of the image processing program that realizes image processing described below. An image processing library 309 is used in the image processing 308. The image processing library 309, for example, is a library that is linked statically or dynamically and is mounted in the storage unit 305. Image processing setting 310 that determines the behavior of the image processing 308 is set in accordance with various operations performed by the operation input device 302 and the like.

In addition, an input/output (I/O) routine that realizes the following functions is included in the image processing program 307. In other words, the I/O routine includes external device control 311, saving data generation 312, an accept instruction 313 from an external control device or the like, and a temporary storage process 314 for temporarily storing data in a RAM area, a cache area of the arithmetic operation unit 304, and the like. In addition, the I/O routine includes display screen generation 315, saved data output 316, an accept operation 317 from the operation input device 302, and the like. Each of the functions described above is mounted in the storage unit 305 in the form of an application (utility) program or a subroutine composed of libraries that are linked statically or dynamically.

By executing the image processing program 307, the image processing device 101, for example, can control the camera 106 and perform image processing using the arithmetic operation unit of the image processing device. In addition, the image processing device 101 can receive a user operation from the operation input device 302 or receive an instruction from an external control device or the like.

In accordance with such an operation or an instruction, the arithmetic operation unit 304 can call each function of the image processing program 307 or the library, perform an arithmetic operation process, and transmit a result of the image processing to the system control device 102. In addition, the arithmetic operation unit 304 may accumulate (log) the result of the image processing in an external storage device. Furthermore, the arithmetic operation unit 304 can compose a screen configuration stored in the program in advance and the result of the image processing as a screen and display the composed screen in the input/output display device 301.

Figure 4:
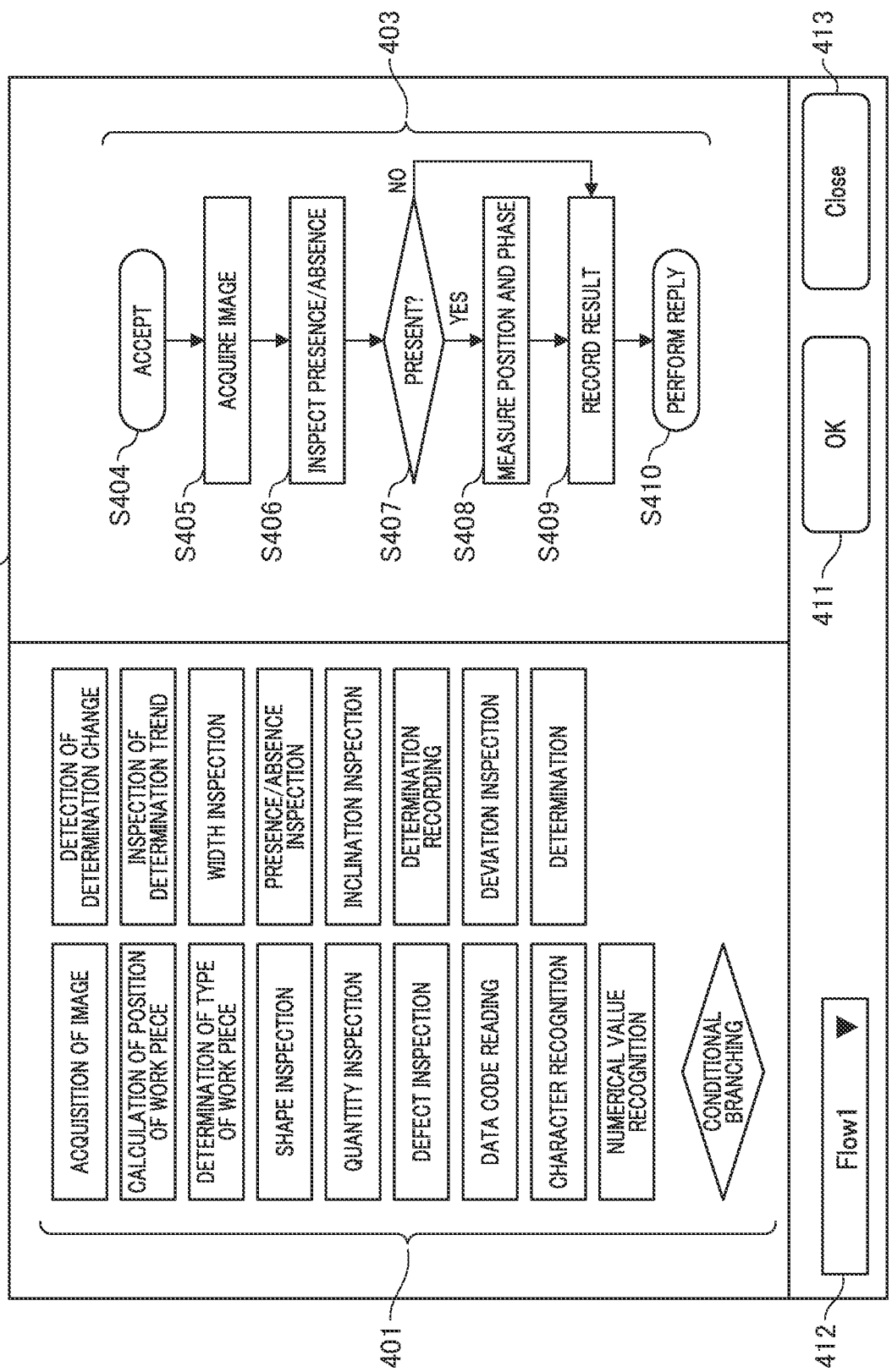
FIG. 4 is a diagram illustrating a flowchart generation screen used for generating an image processing program 307 according to an embodiment.

FIG. 4 is a diagram illustrating a flowchart generation screen used for generating the image processing program 307 according to the embodiment. By executing the flowchart generated here, the image processing device 101 realizes Step S203 for performing image processing in the system control illustrated in FIG. 2. In addition, the screen illustrated in FIG. 4 can be displayed in the input/output display device 301. The image processing program 307 according to this embodiment operates in accordance with the flowchart generated by a user using the image processing device 101.

As another embodiment, a form in which, after the image processing program 307 is generated by an image program generating device not illustrated in FIG. 1, the image processing program 307 is copied to the storage unit 305 of the image processing device 101 may be employed. Alternatively, the image processing program may be provided in a form in which a user selects a package function including combinations of image processing flowcharts that are typically prepared for each function or for each purpose in advance on a GUI or adjusts parameters.

In FIG. 4, a list 401 of processing parts of a flowchart is illustrated. A user performs drag & drop of parts from the list 401 to a flowchart area 402 using a mouse of the operation input device 302 and joins the parts using lines, thereby generating a flowchart.

One example of the image processing flowchart 403 is illustrated. Here, an internal process of the image processing 203 in the operation flow of the system control will be described as an example.

The image processing device 101 accepts an image processing request from the system control device 102 in Step S404. At this time, a flowchart of the image processing may be designated, and image processing parameters for execution and a time of used image data may be designated.

In the image data acquisition process of Step S405, the image processing device 101 acquires image data of a work piece as a target object imaged by the camera 106. Other than that, an image for processing may be acquired from recording data accumulated in the camera. For example, the data to be acquired may be latest image data in the accumulated recording data or image data of a measurement time designated from the system control device.

The generated flowchart inspects (searches) present/absence of a work piece in the acquired image data in Step S406. A presence/absence inspection method, for example, may be acquired from the image processing library 309 and may be a method in which a work piece is extracted, for example, using luminance information and color information, and then presence/absence is determined according to whether an area of the work piece is equal to or larger than a predetermined value. Alternatively, the presence/absence may be calculated through pattern matching using shape feature information of a density distribution and a luminance gradient, and pixels of which luminance gradients are equal to or larger than a predetermined gradient may be extracted as edge information, and the presence/absence may be inspected using a position, the center of gravity, an inclination, and the like of the edge information.

It is determined whether a work piece is present/absent in Step S407. If it is determined that a work piece is not present (No) in accordance with the inspection result obtained in Step S406, the result is recorded in Step S409, and a reply to the system control device 102 with the result is performed in Step S410. If it is determined that a work piece is present (Yes) in Step S407, the process proceeds to Step S408.

A position and a phase of the work piece are measured in Step S408. As a method for measuring a position and a phase of a work piece, a method in which measurement feature information of local pattern image of a density distribution of the work piece and the like, which is recorded and saved on a recording medium in advance, is read and obtained, and a search for a position and a phase having a strong correlation coefficient for the measurement feature information is performed from an input image may be used. Alternatively, a unit configured to extract feature information such as a shape of a luminance gradient of a work piece and the like from an image and generate measurement feature information for measuring a position and a posture of a target object on the basis of the shape feature information may be installed. Then, a search for a position and a phase having a string correlation coefficient on the input image may be performed using the measurement feature information.

In Step S409 for recording results, data such as execution results and determination results acquired in Steps S404 to S408 and the like is recorded. The start time in Step S404 for accepting a processing request and details of certain execution options may be stored as well. In addition, image data obtained in Step S405 for acquiring an image, an image capturing time and an image size, imaging parameters, camera information, and the like may be stored as metadata. Furthermore, extracted area information of a work piece obtained in the inspection of Step S406, density information and gradient information used for the inspection, color information, and the like may be stored. As a result of execution of Step S406, a detected position and a detected phase of a work piece, a correlation value, and the like may be recorded.

An execution result of the flowchart generated in this way is temporarily stored through the temporary storage process 314 performed by the image processing device 101 or is stored in the data saving area 306. In addition, the execution result may be referred to or deleted as necessary, may be transmitted or received through the interfaces 303, or may be stored or input through connection to an external storage unit or the like. The results of Step S409 or some thereof are output in Step S410, and the flowchart ends. When the results from Step S409 are output, the results may be transmitted to the system control device 102, be stored in the data saving area 306 of the image processing device, or be output to and displayed in the input/output display device 301.

In addition, when a user clicks on a button 411, the image processing device 101 can generate the image processing program 307 for executing the flowchart displayed in the flowchart area 402. Furthermore, by inputting a new flowchart name to a list box 412, a user can add a new flowchart to this system. In addition, a user also can select a flowchart to be displayed in the flowchart area 402 using the list box 412. When a button 413 is clicked, the generation of the image processing program ends, and the flowchart area 402 is closed.

In addition, when a user double-clicks on any one of steps that are parts of the image processing flowchart 403, a transition to a setting screen used for setting a detailed process of the part can be performed. Here, a method for registering feature patterns for realizing a position/phase measurement function will be described with reference to FIG. 5 using a setting screen of Step S408 used for measuring a position and a phase as an example.

In addition, a method for generating support data used for supporting the installation operation if a user installs an initial (first) system and then installs an equivalent system for the second time or subsequent times or if a user installs an initial system and then changes the installation state of the camera, or the like will be described.

Figure 5:
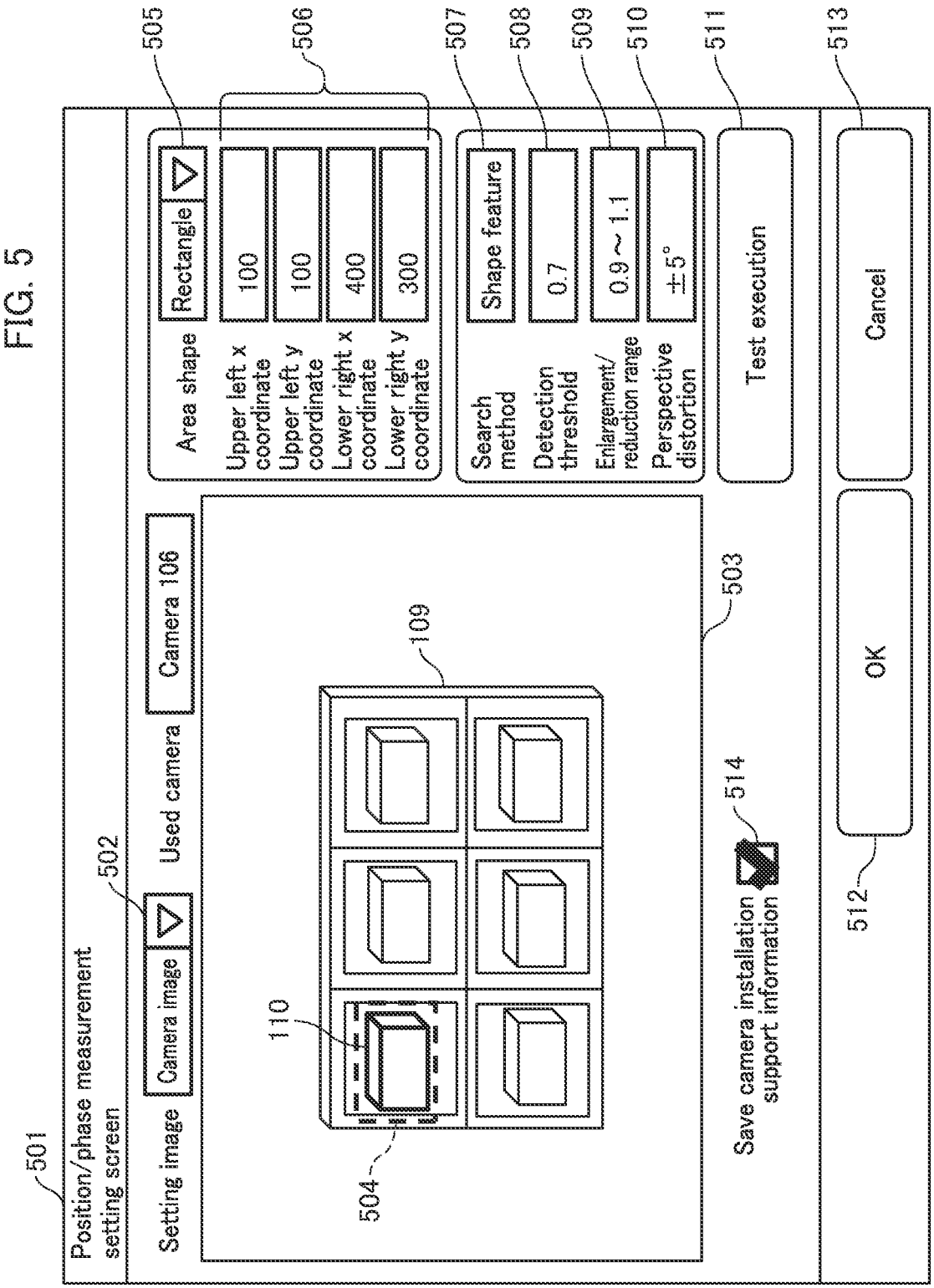
FIG. 5 is a diagram illustrating a search pattern registration screen according to an embodiment.

FIG. 5 is a diagram illustrating a search pattern registration screen according to an embodiment, and a user interface for performing setting of image processing in Step S408 that is a position/phase measurement step (part) for a work piece will be described with reference to FIG. 5.

In the position/phase measurement step S408, a search for a position and a phase having a strong correlation coefficient on an input image is performed, or shape feature information of a luminance gradient of a work piece is extracted using a local pattern image of a density distribution of the work piece as a target object and the like. By using such feature information, a search for a position and a phase having a strong correlation coefficient on the input image is performed. A GUI used for registering a pattern image (measurement feature information) for a search will be described with reference to the screen illustrated in FIG. 5.

A button 502 of a pull-down menu for selecting an input candidate of a "setting image" (an image that becomes a reference for setting image processing) used for setting is illustrated in FIG. 5. A camera 106 is selected as a "used camera" in FIG. 5, and thus a "camera image" is displayed as the "setting image", and, when a user clicks on the button 502, a captured image acquired by the camera 106 is displayed as the "camera image". Other than that, file names of images that have been saved in the data saving area 306 of the image processing device 101 in advance may be displayed as options in the form of a list, and a user may be allowed to select one of the file names. When a user selects a character string from this list, the selected image is registered as a setting image.

The "camera 106" is selected as the "used camera", and the "camera image" is selected as the "setting image" in FIG. 5, a captured image acquired by the camera 106 is used as a setting image. When a button 502 is clicked, an image acquisition step for acquiring an image is performed, and the captured image (camera image) acquired by the camera 106 is displayed in an image display area 503 as a setting image.

Next, the user sets a search pattern setting area 504 that is an area for setting a search pattern (measurement feature information). For the setting, first, an area shape is selected using a button 505.

As an area shape, a shape such as a rectangle, a circle, an oval, or a ring can be selected from the pull-down menu using the button 505. In addition, area addition, area exclusion, and the like using a combination of such shapes may be performed. Furthermore, a free shape may be set using the operation input device 302 such as a mouse. In this embodiment, a case in which a rectangular search pattern setting area 504 is set will be described as an example.

As setting items 506 for a rectangular area, upper left x coordinate/y coordinate and lower right x coordinate/y coordinate of the rectangle are set. Here, an image coordinate system having the upper left side of a captured image as an origin and having an x axis in the horizontal direction, and having a y axis in the vertical direction is used. As a method for designating the setting items 506 for the area, in addition to a method of directly inputting numerical values, a function of providing count-up/count-down buttons and adjusting the setting items by clicking these or the like may be installed.

At this time, the search pattern setting area 504 is displayed with superimposed on the image display area 503 and is updated and displayed at any time. In accordance with this, a user can set the search pattern setting area 504 while checking a setting image in the image display area 503. Here, the setting step described above using the GUI illustrated in FIG. 5 functions as a second generation unit (a second generation step) for generating measurement feature information used for measuring a position and a posture of a target object on the basis of the extracted feature information described above.

Next, a sequence for setting a search method using the search pattern setting area 504 will be described.

Here, for example, "shape feature" is selected as a search method using a search method 507. The search method based on "shape feature" is a method in which shape feature information of a luminance gradient of a work piece is extracted, and a search for a position and a phase having a strong correlation coefficient for the search pattern setting area 504 on an input image is performed using the feature information.

As the search method, other than that, at least one of "normalized correlation", "matching", and the like can be selected. Here, the "normalized correlation" is a method in which local pattern information and the like of a density distribution of a work piece are normalized, and a search for a position and a phase having a strong correlation coefficient for the search pattern setting area 504 is performed. In addition, the "matching" is, for example, a method in which a three-dimensional shape is extracted as a model if the camera 106 can acquire three-dimensional information of a work piece, and a search for the three-dimensional shape is performed inside a three-dimensional space, and a mutual distance is minimized. In addition, at least one of search methods such as "shape feature", the "normalized correlation", "matching", and the like may be configured to be selectable on the basis of a type of model of a camera as an imaging unit.

In addition, in the example illustrated in FIG. 5, "shape feature" is selected as the search method, and it is determined that the shape feature has been able to be detected if a correlation value between the search pattern setting area 504 and a work piece exceeds a predetermined threshold. For example, if a correlation value exceeds a numerical value set in a detection threshold 508 designated in advance, it is determined that the shape feature has been able to be detected.

Other than that, a search for a work piece may be performed for the inside the image with the search pattern setting area 504 being transformable to a specific enlargement/reduction range 509 or a perspective distortion (swing and tilt distortion) range 510, and a work piece entering the range of a threshold may be detected. In the example illustrated in FIG. 5, the enlargement/reduction range 509 is set to 0.9 times to 1.1 times, and thus a similar work piece can be detected from the inside of the image with a size difference of less than 10 percent from a set search pattern allowed.

In accordance with this, even if a distance from a work piece is undefined or there is an individual difference in the work piece, robust detection of the work piece can be performed. In addition, since the perspective distortion range 510 is set to the range of ±5°, a similar work piece can be detected from the inside of the image with a swing and a tilt of ±5° relative to the set search pattern (rotation around a horizontal axis, rotation around a vertical axis, rotation around the image, or the like) allowed. In accordance with this, even if a work piece is tilted, robust detection of a work piece can be performed.

After the setting using 505 to 510 ends, when a test execution button 511 is clicked, imaging is performed using the camera 106 selected as the "used camera", and measurement of a position and a phase of a work piece is performed for an acquired image, and a result of the measurement of the position and the phase of the work piece can be checked.

FIG. 12 is a checking screen for a position/phase measurement result of a work piece when the test execution button 511 is clicked in FIG. 5. An example in which similar feature information is detected in an image of the image display area 503 using a search pattern set in the search pattern setting area 504, and a result thereof is displayed is illustrated.

Work pieces 1201 to 1206 from which shape features similar to those of the search pattern have been detected are highlighted and displayed. Here, although IDs are assigned in order of highest to lowest similarity (correlation), the IDs may be assigned in ascending or descending order of detected coordinates, or IDs may be assigned on the basis of detected sequences or the like. The number of work pieces 1207 from which shape features similar to those of the search pattern have been detected is illustrated.

A window 1208 is used for selecting an ID assigned to each detected work piece and is used for displaying detailed detection information for the selected ID. A window 1209 displays detailed detection information about the ID selected in the window 1208. As the ID of the detected work piece 1201, "1" is selected in the window 1208 in FIG. 12, and thus a result indicating that the search has been performed on the basis of the "shape features" as the search method, and a correlation value as a score is 0.99, and differences in the position and the rotation phase are almost 0 is displayed.

When a cancel button 513 is clicked in this state, the settings set as described above and the setting change parts are discarded.

On the other hand, when an OK button 512 is clicked, the setting of the search pattern setting area 504 set as described above, the settings of the button 505 to the perspective distortion range 510 relating to the position/phase measurement, and the detection results and the like illustrated in FIG. 12 are saved in the data saving area 306 in association with the image processing program 307 and the like. Such information is read when the program is executed or when a transition to the image processing setting screen is performed.

In addition, if a camera installation support information saving button 514 is checked when the OK button 512 is clicked, the process of generating installation support information for supporting installation of a camera is performed, and a result of the process is also saved in association with the image processing program 307. This will be described below.

Figure 6:
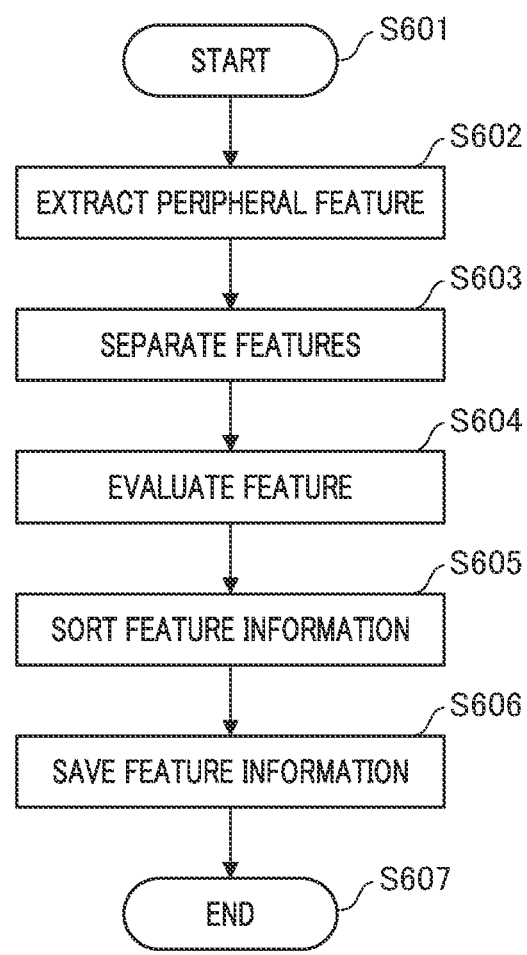
FIG. 6 is a flowchart illustrating a sequence for generating installation support information according to an embodiment.

FIG. 6 is a flowchart illustrating a sequence for generating camera installation support information (support information for installation) according to an embodiment. The sequence illustrated in FIG. 6 illustrates a flow performed by the arithmetic operation unit 304 of the image processing device 101 if the OK button 512 is clicked in a state in which a camera installation support information saving button 514 illustrated in FIG. 5 is checked.

In addition, the flow illustrated in FIG. 6 may be performed when a camera image is input or may be performed in the background during adjustment of the search pattern setting area 504. By configuring as such, pre-processing such as outline extraction, shade calculation, and normalization can be performed in parallel, a user's operation standby time is reduced, and camera installation support information can be generated smoothly.

The arithmetic operation unit 304 of the image processing device 101 starts the flow in Step S601 and extracts peripheral features in Step S602. For a peripheral area of the search pattern setting area 504 in which the search pattern is set in a camera input image, feature information corresponding to shape features are extracted in Step S602. The reason for extracting feature information from the peripheral area is that there is a high possibility of the accuracy being higher if features of not only work pieces but also peripheral environments thereof are used as information for performing installation of the camera.

As a range of the peripheral area, if there are rooms in the capability and the time of the arithmetic operation unit 304, feature information may be extracted from an area including the search pattern setting area 504, for example, the entire image display area 503. In addition, feature information may be extracted within a range of pixels corresponding to a number set in advance.

In other words, feature information used for generating installation support feature information is extracted from a first area of the image, and feature information used for generating measurement feature information is extracted from a second area different from the first area in the image. In addition, it is preferable that the first area be larger than the second area.

Furthermore, feature quantities may be extracted from a peripheral area not including the search pattern setting area 504. Here, Step S602, for example, functions as a feature information extracting unit (a feature information extracting step) that extracts feature information of a target object or the periphery thereof from an image.

In addition, if a feature is found within a predetermined range of the periphery, the area may be widened while widening the feature extraction area until a feature is found on the periphery.

Figure 7:
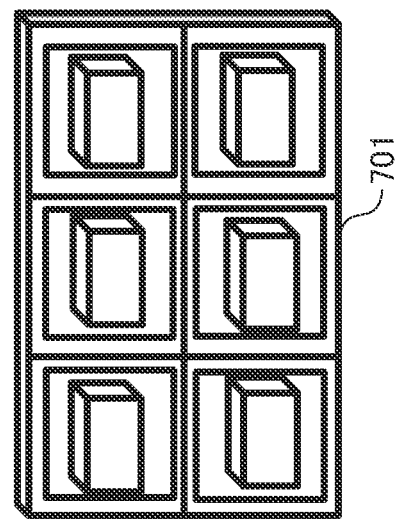
FIG. 7 is a diagram illustrating feature information used for camera installation support according to an embodiment.

FIG. 7 is a diagram illustrating feature information used for camera installation support according to an embodiment, and an example of shape features (feature information) 701 extracted from the entire image in which a search pattern is set is illustrated.

Next, the extracted features 701 are separated in Step S603 illustrated in FIG. 6. A separation method may be considered to be based on various kinds of information such as a position and a shape, a gradient intensity, a shade average, and a shade deviation, and such options may be configured to be selectable in a GUI or a setting file. Here, for simplification of description, separation is assumed to be performed on the basis of connectivity (continuity) of the extracted features 701. For example, a column of "feature information" 702 is a result of separation of the features 701 based on the connectivity.

The separated features 701 are evaluated in Step S604. As an evaluation index, information contributing when the position of the camera, in other words, a relative position between the camera and s work piece is adjusted is used. For example, the evaluation may be considered to be based on various kinds of information such as a size of a feature shape, a magnitude of a shade deviation, distance information from the search pattern setting area 504 on an image for which a model of work pieces is generated, and selection of such various kinds of information may be configured to be performed in a GUI or a setting file. Here, Step S604 functions as an evaluation unit that evaluates feature information extracted by the extraction unit.

Here, an evaluation rank (a priority level) is assumed to be determined on the basis of a size on the image of the separated features 701 as the information described above. In other words, sizes of the separated features 701 are evaluated in Step S604, then sorting of the features is performed on the basis of the sizes in Step S605, and a sequence that is prioritized to be used for camera adjustment support is determined. In accordance therewith, installation support feature information to which priority levels are assigned in accordance with evaluation is generated.

Here, Step S605 functions as a first generation unit (a first generation step) that generates installation support feature information used for supporting installation of the imaging unit on the basis of the extracted feature information.

An image diagram 702 of installation support feature information generated by separating the feature information on the basis of the connectivity and performing sorting using size information as an evaluation index is illustrated. IDs are sorted in order of priority levels in the image diagram 702.

Step S606 is a process of saving the generated installation support feature information. In other words, search information such as the setting of the search pattern setting area 504 set as described above and settings of the button 505 to the perspective distortion range 510 relating to measurement of a position and a phase is saved. In addition, by clicking the OK button 512, search information such as the installation support information that have been extracted and calculated in Steps S602 to S605 is also saved in the data saving area 306 and the like of the image processing device 101 in association with the image processing program 307. Thereafter, the flow ends in Step S607.

In addition, the installation support information described above includes the feature information represented in the features 701 and the feature information 702, a size, a position, a phase, intensity gradient information, color information, an evaluation value, a priority level, which is used for camera installation support, an original image, which is displayed in the image display area 503, and the like of each piece of feature information. In addition, the installation support information is used as search information for searching a target object.

Furthermore, the setting information and the installation support information as described above may be transmitted/received to/from the outside through the interfaces 303 together with being stored in the temporary storage process 314 and the data saving area 306. In addition, the information described above may be stored in a connected external storage device or the like or may be input from an external storage device.

Next, a method for replicating a system equivalent to the production system illustrated in FIG. 1 using the installation support information and a captured image acquired by a camera, and image processing and supporting installation of second and subsequent cameras in the same production system will be described with reference to FIGS. 8 to 13. In addition, support is performed by evaluating reproducibility of an installation position and a posture of a camera, outputting the evaluation results, and further outputting equivalent image processing results.

Figure 8:
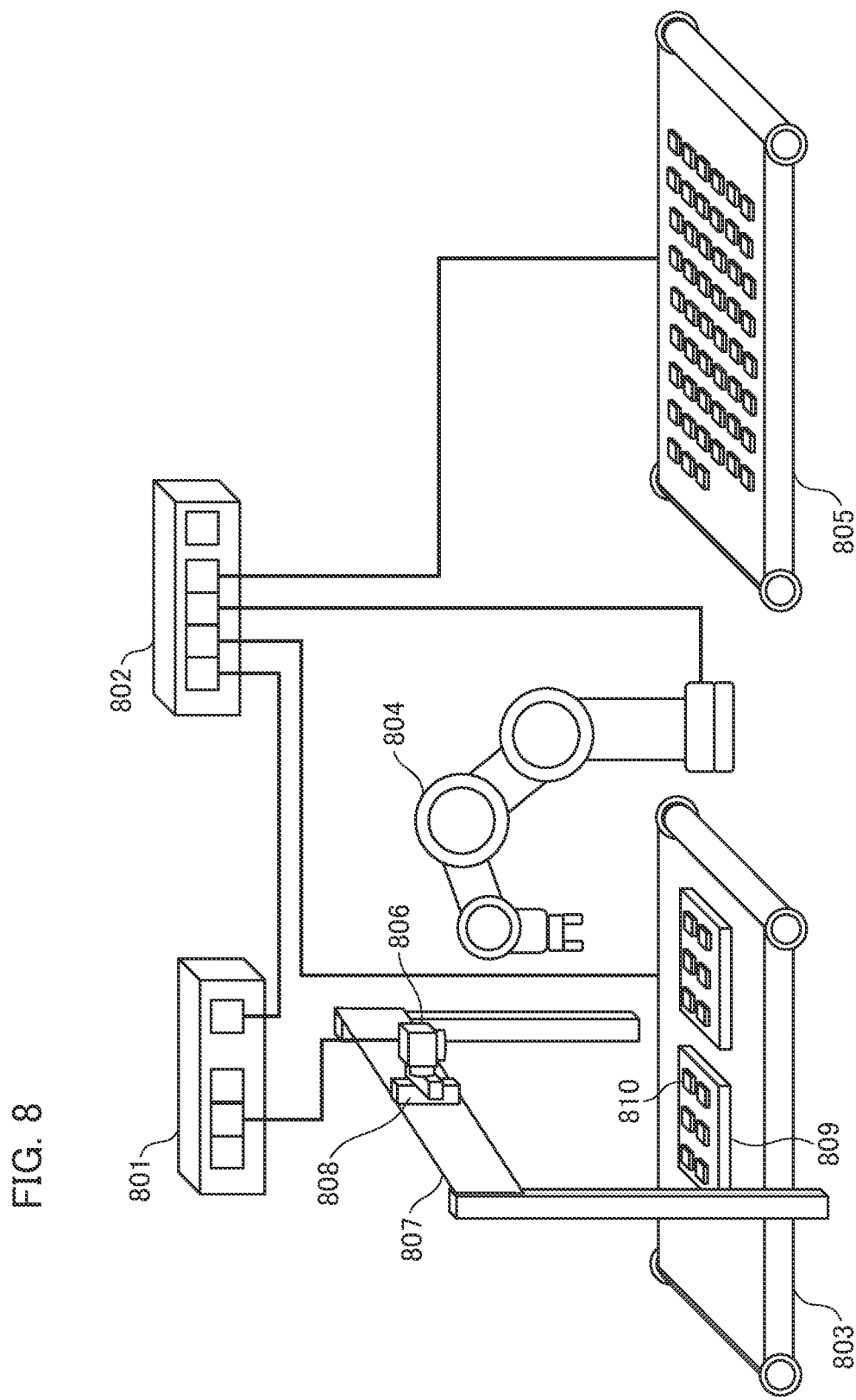
FIG. 8 is an entire configuration diagram of a replicated system according to an embodiment.

FIG. 8 is an entire configuration diagram of a replicated system according to an embodiment and illustrates a replicated system of the production system illustrated in FIG. 1.

An image processing device 801 to work pieces 810 illustrated in FIG. 8 have configurations similar to the image processing device 101 to the work pieces 110 illustrated in FIG. 1, and thus description thereof will be omitted. In addition, control of the system in FIG. 8 performs an operation flow similar to that illustrated in FIG. 2. A second imaging unit 806 functions as a second imaging unit that acquires an image of a target object.

In addition, the internal configuration of the image processing device and specifications of an operation flowchart generation screen, a method for registering a search pattern, and the like have configurations similar to those illustrated in FIGS. 3 to 5. It is assumed that various kinds of setting information set in the production system illustrated in FIG. 1 and search information such as the installation support information are saved through connection to an external storage unit and the like via interfaces 303.

In this state, if physical arrangement, features, and the like of the image processing device 801 to a work piece 810 in the replicated system illustrated in FIG. 8 are reproduced with features and accuracy equivalent to those of the production system illustrated in FIG. 1, a process similar to the flowchart 403 illustrated in FIG. 4 can be performed in the image processing of the image processing device 801. Furthermore, the flow illustrated in FIG. 2 including the image processing flow can be also performed in this way, and thus a production system (conveying system) having an operation capability equivalent to that illustrated in FIG. 1 can be easily replicated (additionally installed).

However, actually, even if arrangement and device production are performed in accordance with the plan of the system when the production system (the conveying system) is replicated, there may be assembly error in each assembly process, or there may be an individual difference for each device or each member. For this reason, such error is accumulated in the entire system, and it is extremely difficult for a replicated system to reproduce a similar system operation immediately after the assembly. Thus, after assembly of the system, many adjustment operations and operation checking operations accompanying trial and error for reproducing a target system operation are necessary for each device and each member.

Figure 9:
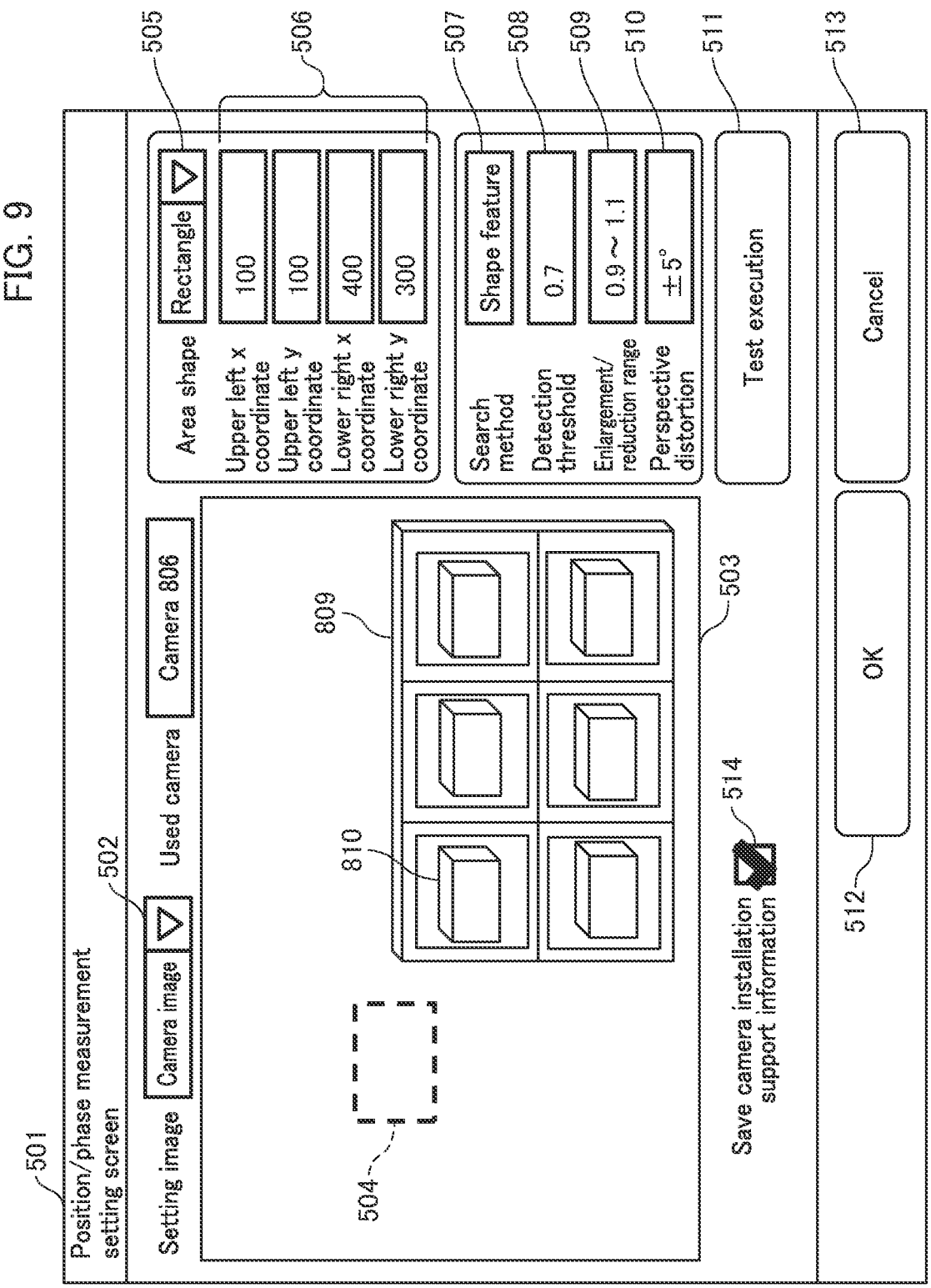
FIG. 9 is a diagram illustrating a search pattern registration screen of the replicated system illustrated in FIG. 8.

FIG. 9 is a diagram illustrating a search pattern registration screen of the replicated system illustrated in FIG. 8. Constituent elements 502 to 513 of the screen are the same as the constituent elements 502 to 512 illustrated in FIG. 5, and thus description thereof will be omitted. In addition, various kinds of setting data of the image processing device are reproduced by reading processing parameters that have been set and saved in each processing block of the image processing flowchart 403 that has been saved at the time of initial system setting.

In addition, the setting of the search pattern setting area 504 and parameter settings of 505 to 510 relating to the measurement of a position and a phase, in other words, measurement feature information and the like for measuring a position and a posture of a target object are obtained by reading data saved as search information.

Then, the image processing device 801 measures a position and a posture of the work piece described above by searching for the measurement feature information described above from an image obtained by a camera. In addition, by performing a predetermined process such as a process of gripping the target object described above using the robot 804 described above on the basis of the position and the posture of the target object described above as measurement results and conveying the target object to a predetermined position of the conveying device 805 or the like or a process of performing a predetermined processing, a desired product is manufactured.

However, at this time, in the camera 806 in the replicated system, for example, there is a high possibility of a relative positional relation between the camera 806 and the work piece 810 or the tray 809 in which the work piece 810 is installed and the conveying device 803 not being physically reproduced with high accuracy. For this reason, as illustrated in FIG. 9, positions of the search pattern setting area 504 and the work piece 810 do not coincide with each other. Thus, in the state illustrated in FIG. 9, appropriate setting cannot be performed, and even when the pattern search (the measurement of a position and a phase) and image processing and the system as represented in the image processing flowchart 403 are performed, a desired operation cannot be reproduced.

In such a case, a system installation staff needs to perform adjustment by adjusting the position and the posture of the camera 806 using an adjustment stage 808 and the like of the camera or adjusting the arrangement and the like of a stand 807, the loading device 803, and the like in some cases such that desired image measurement can be performed. In addition, also when adjustment is performed, it is necessary to repeat checking of a captured image obtained by the camera, checking of the operation of the image processing device, checking of the operation of the system, and the like many times while adjusting a relative positional relation between the camera and various peripheral devices (the robot, the conveying device, the workbench, and the like). For this reason, extensive efforts and time are required for securing a processing speed, accuracy, and reliability that are requested.

In contrast to this, in this embodiment, high efficiency of an installation operation of such an imaging device can be realized.

Figure 10:
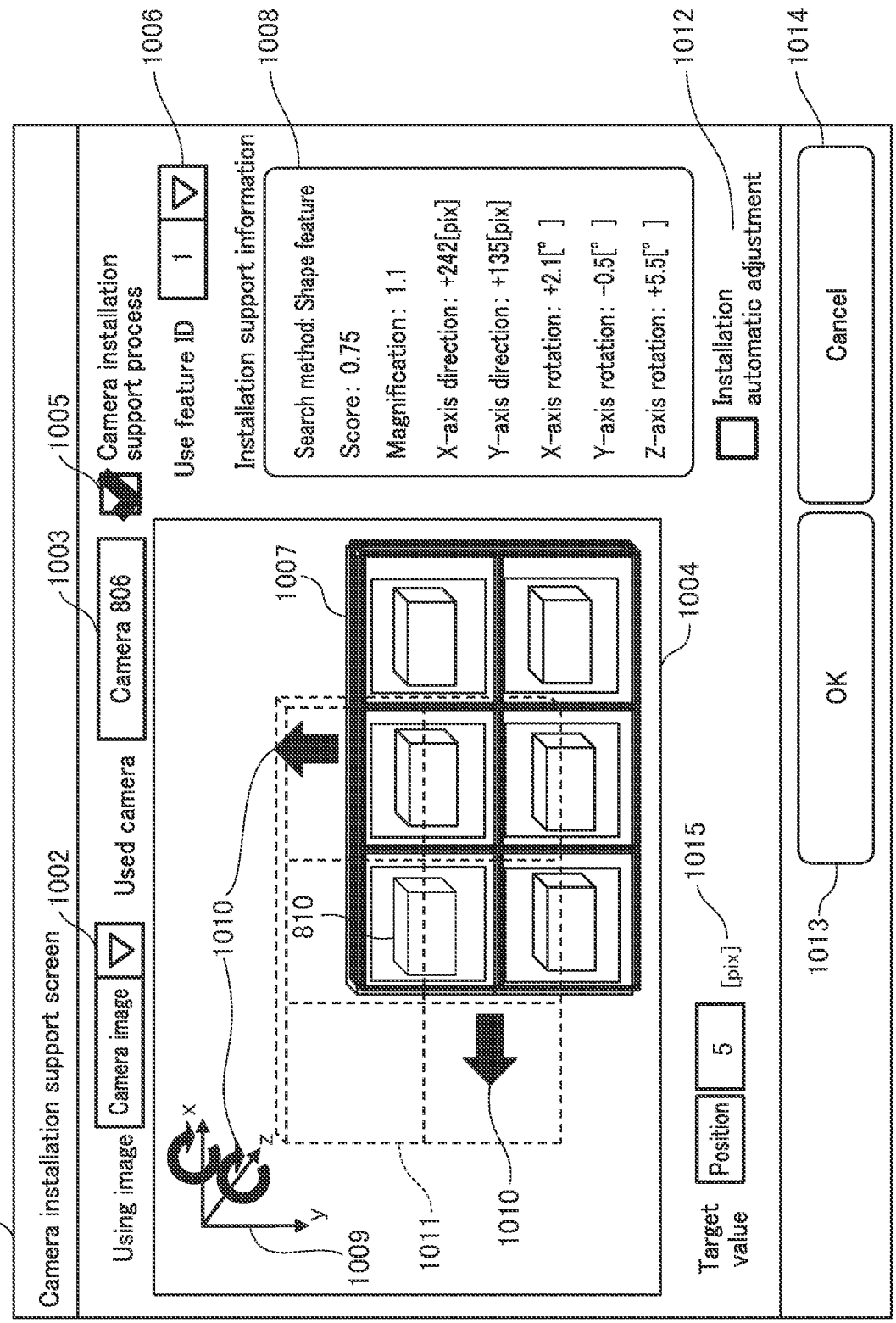
FIG. 10 is a diagram illustrating a camera installation support screen according to an embodiment.
Figure 11:
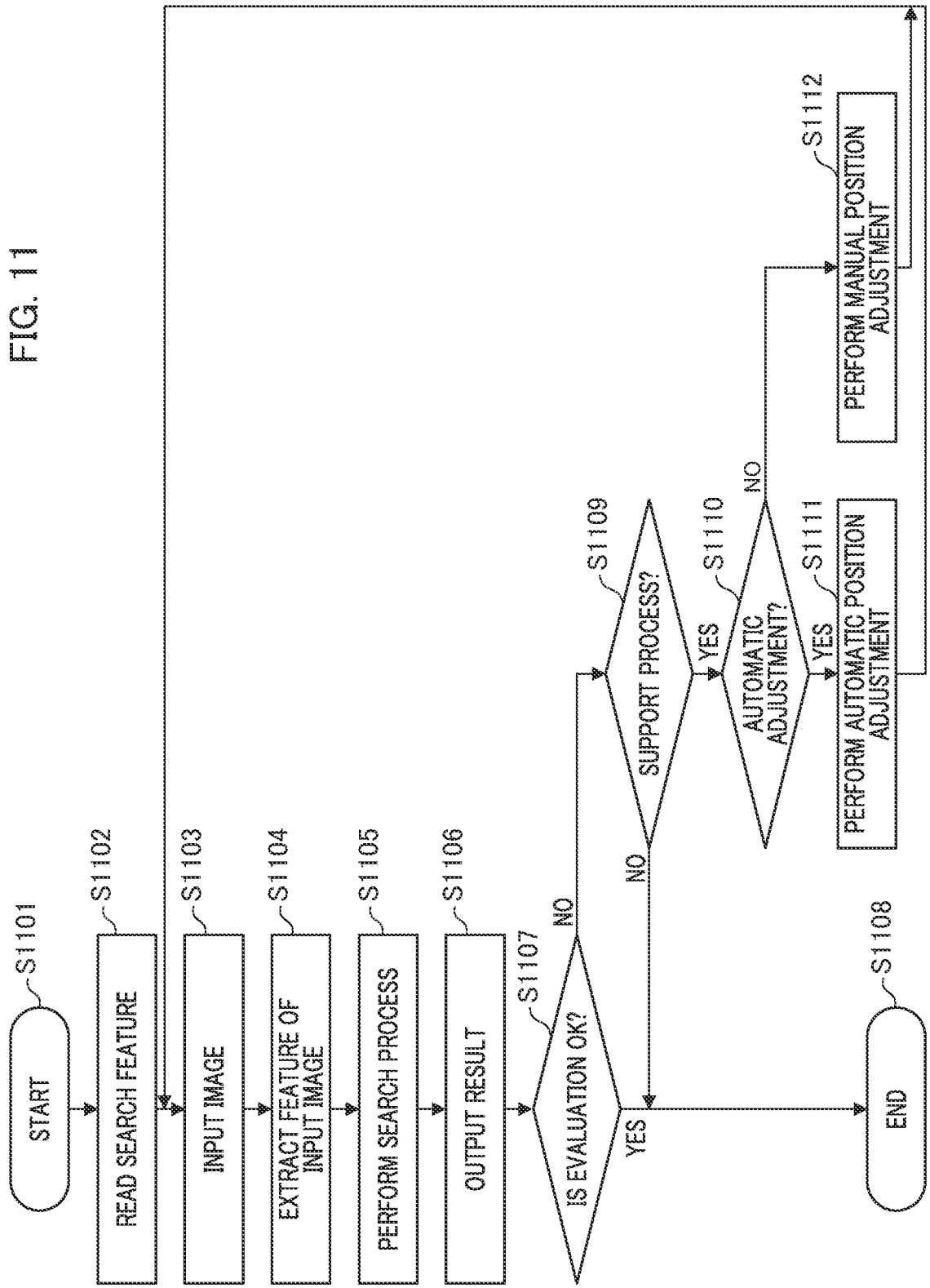
FIG. 11 is a flowchart illustrating a camera installation support process according to an embodiment.

FIG. 10 is a diagram illustrating a camera installation support screen according to an embodiment, and FIG. 11 is a flowchart illustrating a camera installation support process according to an embodiment.

Hereinafter, an operation of a program for supporting adjustment of the camera installation position according to this embodiment will be described with reference to FIGS. 10 and 11.

A screen 1001 for supporting installation of a camera is illustrated, and a button for starting a camera installation support process program may be provided on a setting screen 501 illustrated in FIG. 9, and the camera installation support process program may be configured to be started if the setting of image processing does not go well or the like. In addition, a button for starting a camera installation support process program may be provided on a screen for generating a flowchart of image processing like the flowchart area 402 illustrated in FIG. 4, and adjustment of the installation position of the camera and checking of the installation state may be performed before the setting of each image processing in FIG. 4.

A button 1002 is used for selecting an input candidate of an image that is an installation support target and is configured as a camera image here, and a stored image that has been imaged by a camera in advance or the like may be read.

A button 1003 is used for designating a camera that is an installation support target, and here a camera 806 is selected. In an image processing system in which a plurality of cameras are connected, a plurality of cameras may be configured to be selectable, and switching between information sources (the information saved in advance in FIG. 7) for supporting installation of a camera may be performed in accordance with the selected camera.

A display area 1004 is used for displaying an input image of the camera 806 and information for supporting installation of a camera in a superimposing manner.

A check box 1005 indicates whether or not a camera installation support process is performed, and when the check box is checked, the camera installation support process is performed. For example, if an arithmetic operation load for image processing for camera installation support is high, and the image processing causes an obstacle in other image processing and operations, this check bock may be turned on only when the camera installation adjustment is performed. Details of the camera installation support process will be described in detail with reference to a flowchart illustrated in FIG. 11.

A button 1006 is for selecting a use feature ID used for the camera installation support process. In other words, the button 1006 functions as a setting unit that sets search information on the basis of an image and can set predetermined feature information as search information on the basis of results of evaluation (priority levels) performed by the evaluation unit.

Here, as described in the feature information 702 illustrated in FIG. 7 and the like, the use feature ID is an ID number associated with feature information to which a specific evaluation value is assigned.

A result 1007 is a result of a search for installation support feature information corresponding to the use feature ID1 on an input image and is displayed with being superimposed in the input image.

The result 1008 of the search of the installation support feature information on the input image is represented as a numerical value or the like. In this embodiment, as illustrated in the search method 507 illustrated in FIG. 5, shape feature information is used as image processing for measuring a position and a phase, and thus shape features are selected as installation support feature information for supporting installation of a camera in accordance therewith. However, as the installation support feature information, local shade information or the like may be used, and, if the camera uses an imaging element, a stereo camera or the like that is able to obtain a three-dimensional shape, three-dimensional shape information may be used.

In addition, as a result 1008 of performing the image search using the shape feature information, a search score (similarity, a correlation value), an enlargement/reduction magnification at the time of closest coincidence, a horizontal position, a vertical position, a rotation value in each axial direction, and the like are displayed. A user adjusts the position of the camera while referring to this numerical value. Generally, it is preferable to perform adjustment such that a degree of coincidence with the feature information for camera installation support that has been saved in advance becomes a maximum, in other words, the search score is the highest as possible, and the enlargement/reduction magnification is near 1.0 as possible, and the amount of deviation of each axial direction is near 0.

In addition, in this embodiment, although adjustment can be performed while referring to the search score, the magnification, and the amount of deviation in each axial direction, at least one of these three pieces of information may be displayed, and adjustment may be performed while referring to it.

Guide information 1009 defines axes of an input image with the horizontal direction set as the X axis, the vertical direction as the Y axis, a depth direction of an image forming surface set as the Z axis. However, the axial directions may be set in accordance with situations of the used camera and the image processing library.

Visual support information 1010 and 1011 support the installation position of the camera. For example, directions of deviations in the directions of the X axis and the Y axis, a direction of a deviation of a rotation direction of each axial center, and the amounts of such deviations may be displayed like the visual support information 1010 using directions of arrows, lengths of arrows, and the like, or the position of the feature information of the original image that is a target may be displayed in a superimposing manner like the visual support information 1011. In accordance with this, a user can visually obtain support information used for adjusting installation of the camera. In this way, by displaying at least one of the adjustment direction and the amount of adjustment of the imaging unit on the basis of a result of the search, the adjustment process can be shortened.

A check box 1012 is used for executing an installation automatic adjustment program that automatically performs installation of a camera. By checking the check box 1012, the automatic adjustment function is turned on. This function, for example, can be used if the camera 806 or the adjustment stage 808 of the camera includes an adjustment mechanism (the adjustment unit) of pan, tilt, position adjustment, zoom, and the like. In addition, the adjustment unit may be configured to be able to adjust at least one of pan, tilt and zoom.

The automatic adjustment is performed such that various numerical values as represented in 1008 become appropriate while operating such an adjustment mechanism. In addition, the image processing system may be configured to automatically detect whether the adjustment function (the adjustment mechanism) as described above is present in the camera 806 or the adjustment stage 808 of the camera and display the check box 1012 to be checkable if it is determined that the adjustment function is present. On the other hand, if it is determined that there is no adjustment function, the check box 1012 may be displayed in gray or may not be displayed such that checking is not able to be performed.

When adjustment is performed, a direction in which at least one of numerical values of the search score, the magnification, the amount of deviation in each axial direction and the like of 1008 becomes a predetermined value or less may be configured to be found by scanning the entire movable range of the adjustment mechanism. Alternatively, a direction in which a weighted sum value of such numerical values becomes a value set in advance or less may be configured to be found. Alternatively, proportional control, feedback control of a PID, or the like may be performed using an amount of adjustment of the adjustment mechanism, various numerical values of 1008 changing accompanying such adjustment, and the like.

A target value 1015 of error between feature information set at the time of performing camera installation support and a search result is illustrated and, for example, here a success (completion of adjustment) is determined if the amount of position deviation in each axial direction is within 5 pixels.

An OK button 1013 is used for ending the camera installation adjustment support and ending this screen 1001 if preferable camera adjustment was able to be performed while referring to the displays 1015.

In the case of automatic adjustment, the button 1013 may be configured to be automatically turned on when the error converges to a target value 1015. In the case of manual adjustment, a user may check that the error converges within the target value 1015 and end the adjustment by turning on the button 1013. When the adjustment ends, the use feature ID at that time, the camera image, the information about the used camera, various numerical value information (the installation support information) 1008, and the like may be recorded together.

A cancel button 1014 is used for ending the camera installation adjustment support and ending this screen 1001 if preferable camera adjustment cannot be performed even by using the feature information prepared in advance, the search condition, and the like.

Next, as described above, FIG. 11 is a flowchart illustrating a camera installation support process according to an embodiment, and the process of each step illustrated in FIG. 11 is performed by a computer within the image processing system executing a computer program stored in the memory.

As illustrated in FIG. 11, a camera installation support process starts in Step S1101. A start timing is a timing at which the check box 1005 of the camera installation support process is clicked in the example illustrated in FIG. 10. However, other than that, a timing at which the support screen 1001 opens or the like may be set as the start timing.

Feature information used for a search is read in Step S1102. Since ID1 is selected by the button 1006 as the use feature ID in FIG. 10, and thus as illustrated in 702 of FIG. 7, feature information and the like of ID1 having the largest size are read as installation support feature information. In other words, Step S1102 functions as an information acquiring unit (an information acquisition step) that acquires installation support feature information for supporting installation of the imaging unit.

An image that is a processing target is input in Step S1103. In other words, an image that is the processing target is input from the camera 806 or a storage device.

Step S1104 is a process of extracting features of the input image, and feature information for a search process is extracted from the image input from the camera or the like.

Here, since "shape feature" is selected as the search method, the shape feature information is extracted using luminance, gradient information, and the like of the image.

Step S1105 is a feature information search process, and a search for a position, a phase, an enlargement/reduction magnification, and the like of feature information having a strong correlation coefficient with the installation support feature information read in Step S1102 is performed on the basis of the feature information extracted in Step S1104. In other words, Step S1105 functions as search unit (a search step) that searches for the installation support feature information acquired by the information acquiring unit from the image acquired from the imaging unit. When the search is performed, similar to a time when the search pattern setting area 504 is registered on the setting screen 501 for measuring a position and a phase illustrated in FIG. 5, a parameter setting of the button 505 to the perspective distortion range 510 relating to measurement of a position and a phase may be used.

Alternatively, a search for a pattern may be performed using a setting screen similar to 501 or a setting file. In addition, as described above, the search unit may perform a search using at least one search method among "shape feature", "normalized correlation", "matching", and the like on the basis of the installation support feature information.

In this way, even if a deviation is present in the input image, a work piece, or measurement environments, a search for feature information can be robustly performed. In other words, if there is a slight difference between the initial system and the environment, feature information is detected, and a numerical value and support information for correcting the position of the camera can be output.

Step S1106 is a result output process.

The search result acquired in Step S1105 is output and displayed as numerical values like the installation support information 1008 illustrated in FIG. 10. At this time, Step S1105 functions as a display unit that displays a search result acquired by the search unit and functions as an installation supporting unit (an installation support step) that supports the installation of the imaging unit described above on the basis of the search result acquired by the search unit.

In Step S1107, the search result acquired in Step S1106 is evaluated. If the result is preferable (for example, the installation support information 1008 is within the range of the target value 1015), Yes is determined, and the camera installation support process ends. On the other hand, if the evaluation is not preferable, No is determined, and the process proceeds to Step S1109.

In Step S1109, it is checked whether the check box 1005 of the camera installation support process is turned on. If the checkbox is turned on, Yes is determined, and the process proceeds to Step S1110. On the other hand, if the check box is turned off, No is determined, the process proceeds to Step S1108, and the processing flow ends.

In Step S1110, it is detected whether an adjustment function for being able to adjust the direction, the position, and the zoom of the camera is present in the camera 806 or the adjustment stage 808 of the camera, and if the adjustment function described above is present, it is determined whether checking of the check box 1012 of installation automatic adjustment of the camera is turned on.

Then, if Yes is determined in Step S1110, the process proceeds to Step S1111 of camera position automatic adjusting step. On the other hand, if off is determined, No is determined and, the process proceeds to manual position adjustment step S1112.

In Step S1111, the camera position automatic adjustment is performed. If the adjustment function (an adjustment mechanism) that adjusts at least one of pan, tilt, and zoom of the camera is present in the camera 806 or the adjustment stage 808 of the camera, the amount of adjustment is instructed.

As described above, if the entire movable range of the adjustment mechanism is scanned, for example, evaluation values are acquired while an instruction value is changed using an appropriate interval value, and the adjustment may end at a time point at which the evaluation value becomes a predetermined value or less. Alternatively, adjustment may be controlled such that it continues until a best evaluation value is acquired. In other words, Step S1111 functions as an automatic adjusting unit that performs adjustment of a position or a posture of the imaging unit on the basis of the search result and adjusts at least one of the pan, the tilt, and the zoom.

If feedback control or the like is used in Step S1111, a next instruction value may be determined on the basis of a relation between the previous evaluation value and the instruction value, and the adjustment may end at a time point at which the evaluation value becomes a predetermined value or less, or at a time point at which an evaluation value converges within a predetermined width. In Step S1111, when the automatic adjustment instruction is performed, the process returns to the input of an image in Step S1103.

In Step S1112, the position of the camera is manually adjusted. For example, the adjustment is performed if an adjustment mechanism of the camera or an adjustment mechanism of the stage is a manual adjustment mechanism, if adjustment to outside the movable range of the automatic adjustment mechanism is necessary, or the like.

In addition, in the flowchart illustrated in FIG. 11, after the adjustment of the camera (Step S1111 or Step S1112), the image input step S1103 is performed. However, instead of proceeding to Step S1103, it may be determined whether the evaluation value has been enhanced. If there is no enhancement or the like, the use feature ID used for a search may be switched to another ID, and the read step S1102 may be performed. In such a case, it is preferable that the ID number be changed such that the size of the feature information is decreased.

In this way, the installation position of the camera can be adjusted while trying feature information switching supporting installation of a plurality of cameras, and thus more preferable installation of the camera can be performed.

FIG. 13 is an image measurement result checking screen. In FIGS. 5, 9, and 12, the same reference signs represent the same components, and thus description thereof will be omitted.

In order to perform image processing similar to that of the image processing device 801 of the first system, an image processing device 801 of each of the second and subsequent (replicated) systems calls the flowchart area 402 illustrated in FIG. 4. Then, by clicking Step S408 that is a position/phase measurement processing unit inside the flowchart area 402, a setting screen 501 illustrated in FIG. 13 can be opened. In addition, on the camera installation support screen 1001 illustrated in FIG. 10, setting may be performed such that an automatic transition to the next step is performed at a time point at which an installation target value 1015 is satisfied.

In FIG. 13, a measurement result of a position and a phase of a work piece at the time of clicking a test execution button 511 is displayed in the image display area 503. In other words, a search is performed using the search pattern setting area 504 set to the image processing device 101 of the initial (first) system, similar feature information is detected from the inside of the captured image acquired by the camera 806, and a result thereof is displayed.

1301 to 1306 highlight and display work pieces from which shape features similar to the search pattern have been detected, and, similar to FIG. 12, IDs are assigned in order of highest to lowest search score (similarity, correlation). 1303 has the highest score according to the influence of a work piece being disposed in a tray 809 on which physical position restriction is weak, an individual difference, and the like, and thus ID1 is assigned thereto. According to detection information 1309 at this time, it can be understood that there is little amount of rotation deviation in the X-axis direction to the Z-axis direction (the camera and the tray and the work piece can face each other), and the position is measured such that the place of the tray has high accuracy.

By performing such result checking display, it can be easily checked that an image measurement result that is equivalent to a result of image processing of the initial (first) system is acquired in second and subsequent camera installation operations in the second or subsequent systems or the same system. Here, it is apparent that whether an output numerical value is in a preferable error range depends on the performance and the like required by the system.

As above, in this embodiment, by using a camera and an image processing device adjusted in the initial (first) conveying system or production system, a search pattern for measurement (measurement feature information) can be generated and recorded.

In addition, for supporting the second and subsequent equivalent systems or installation of second and subsequent cameras in the same system, generation, storage, transmission, and the like of installation support feature information can be performed. Thus, an adjustment operation for installing a camera can be significantly reduced.

In addition, feature information is searched from the image, and thus, in the measurement of a position and a phase, search parameters such as 505 to 510 can be adjusted and set. In other words, when the search is performed on the basis of search information, the parameters for the search can be adjusted, and thus even if there are deviations in an input image, a work piece and a measurement environment, feature information can be robustly detected. Thus, installation of cameras can be flexibly supported.

In addition, as feature information, for example, various kinds of information of the feature information such as a size of a feature shape, a magnitude of a shade deviation, and deviation information from the search pattern setting area 504 on an image for which a model of work pieces is generated can be analyzed. Thus, determination of a user can be supported by evaluating feature information for performing installation of a camera in accordance with features of the process of the production system (for example, a background, conditions for work pieces to flow in, a stand and arrangement of devices, and the like) and outputting evaluation values.

Then, in second and subsequent equivalent systems or in second and subsequent camera installation operations in the same system, the installation support feature information described above and the setting data are read or received. Then, by using such generated installation support feature information, the setting data, the captured image acquired by a camera, and image processing, the reproducibility of the installation position and the posture of the camera are evaluated, and the evaluation result can be output or an equivalent image processing result can be output. In accordance with this, a user can perform installation of a camera while checking the evaluation results (a numerical value, a support display, and the like), in other words, the reproducibility, and thus repetition of trial and error for adjustment of the camera and checking of the operation of the system is not required, and the number of adjustment steps can be significantly reduced.

In addition, the installation support feature information for performing camera installation support can be selected again on the basis of the evaluation result of the feature information, and thus preferred feature information according to the configuration of the system, the environment of the image processing process, background information, and the like can be easily selected. Furthermore, trial and error of the user can be reduced.

In addition, if the camera or the adjustment stage of the camera includes an adjustment mechanism of pan, tilt, zoom, and the like, a user can try automatic adjustment before manual adjustment of the position of the camera, the adjustment operation can be reduced.

Furthermore, if the camera or the adjustment stage of the camera includes an adjustment mechanism of pan, tilt, zoom, and the like, the arrangement of the camera, for example, can be also adjusted such that various numerical values represented in 1008 illustrated in FIG. 10 become preferable while manually operating such an adjustment mechanism. Thus, a user's manual adjustment process for the position and the posture of the camera can be shortened.

In addition, it can be easily checked that an image measurement result that is equivalent to a result of image processing of the initial (first) production system is acquired in second and subsequent replicated production systems or in second and subsequent camera installation operations in the same system.

Furthermore, according to this embodiment, the production system including a gripping unit that grips a target object on the basis of a measurement result acquired by the measurement unit of the image processing device described above can be efficiently replicated.

In addition, a product manufacturing method including a gripping step of gripping a target object on the basis of a result of the measurement acquired by the measurement unit of the image processing device and a processing step of performing a predetermined process on the target object gripped in the gripping step can be efficiently replicated. Thus, an adjustment operation process in the second and subsequent production systems acquired by replicating the initial (first) production system or in second and subsequent camera installation operations of the same production system can be significantly shortened, and the replication efficiency of the production (product manufacturing) system can be significantly improved.

While the present disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions. In addition, as a part or the whole of the control according to this embodiment, a computer program realizing the function of the embodiment described above may be supplied to the image processing device through a network or various storage media. Then, a computer (or a CPU, an MPU, or the like) of the image processing device may be configured to read and execute the program. In such a case, the program and the storage medium storing the program configure the present disclosure.

This application claims the benefit of Japanese Patent Application No. 2021-020421 filed on Feb. 12, 2021, which is hereby incorporated by reference herein in its entirety.

What is claimed is:

1. An image processing device comprising at least one processor configured to function as:
   an information acquiring unit configured to acquire installation support feature information used for supporting installation of an imaging unit;
   a search unit configured to search for the installation support feature information acquired by the information acquiring unit from an image acquired by the imaging unit;
   an installation supporting unit configured to support the installation of the imaging unit on the basis of a result of the search performed by the search unit, wherein the installation supporting unit includes a display unit configured to display at least one of an adjustment direction and an amount of adjustment of the imaging unit on the basis of the result of the search performed by the search unit;
   and a gripping unit configured to grip a target object based on the result of the search.

2. The image processing device according to claim 1, wherein the search unit is able to adjust parameters used for the search.

3. The image processing device according to claim 1, wherein the installation supporting unit includes an automatic adjustment unit configured to adjust a position or a posture of the imaging unit on the basis of the result of the search.

4. The image processing device according to claim 3, wherein the automatic adjustment unit adjusts at least one of pan, tilt, and zoom.

5. The image processing device according to claim 1, wherein the search unit performs the search using at least one search method among shape feature, normalized correlation, and matching on the basis of the installation support feature information.

6. The image processing device according to claim 1, wherein the search unit is able to select a search method on the basis of a type of the imaging unit.

7. The image processing device according to claim 1, further comprising a measurement unit configured to acquire measurement feature information used for measuring a position and a posture of a target object, search for the measurement feature information from the image acquired by the imaging unit, and measure the position and the posture of the target object.

8. A production system comprising at least one processor configured to function as:
   an information acquiring unit configured to acquire installation support feature information used for supporting installation of an imaging unit;
   a search unit configured to search for the installation support feature information acquired by the information acquiring unit from an image acquired by the imaging unit;
   an installation supporting unit configured to support the installation of the imaging unit on the basis of a result of the search performed by the search unit, wherein the installation supporting unit includes a display unit configured to display at least one of an adjustment direction and an amount of adjustment of the imaging unit on the basis of the result of the search performed by the search unit;

a measurement unit configured to acquire measurement feature information used for measuring a position and a posture of a target object and measure the position and the posture of the target object by searching for the measurement feature information from the image acquired by the imaging unit; and a gripping unit configured to grip the target object on the basis of a result of the measurement performed by the measurement unit.

9. A product manufacturing method comprising:

acquiring installation support feature information used for supporting installation of an imaging unit;

searching for the installation support feature information acquired in the acquiring of installation support feature information from an image acquired by the imaging unit;

supporting the installation of the imaging unit on the basis of a result of the search acquired in the searching for the installation support feature information, wherein the supporting the installation of the imaging unit includes displaying at least one of an adjustment direction and an amount of adjustment of the imaging unit on the basis of the result of the searching;

acquiring measurement feature information used for measuring a position and a posture of a target object and measuring the position and the posture of the target object by searching for the measurement feature information from the image acquired by the imaging unit;

gripping the target object on the basis of a result of the measurement acquired in the measuring of the position and the posture; and performing predetermined processing on the target object gripped in the gripping of the target object.

10. An image processing method comprising:

acquiring installation support feature information used for supporting installation of an imaging unit;

searching for the installation support feature information acquired in the acquiring of installation support feature information from an image acquired by the imaging unit;

supporting the installation of the imaging unit on the basis of a result of the search acquired in the searching for the installation support feature information wherein the supporting the installation of the imaging unit includes displaying at least one of an adjustment direction and an amount of adjustment of the imaging unit on the basis of the result of the searching;

and gripping a target object based on the result of the searching.

\* \* \* \* \*